(12) United States Patent
Tsukuba et al.

(10) Patent No.: US 10,136,161 B2
(45) Date of Patent: Nov. 20, 2018

(54) DMM PREDICTION SECTION, IMAGE DECODING DEVICE, AND IMAGE CODING DEVICE

(71) Applicant: SHARP KABUSHIKI KAISHA, Sakai, Osaka (JP)

(72) Inventors: Takeshi Tsukuba, Sakai (JP); Tomohiro Ikai, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 23 days.

(21) Appl. No.: 15/321,083

(22) PCT Filed: Jun. 22, 2015

(86) PCT No.: PCT/JP2015/067921
§ 371 (c)(1),
(2) Date: Dec. 21, 2016

(87) PCT Pub. No.: WO2015/199040
PCT Pub. Date: Dec. 30, 2015

(65) Prior Publication Data
US 2017/0142442 A1   May 18, 2017

(30) Foreign Application Priority Data
Jun. 24, 2014   (JP) ................. 2014-129099

(51) Int. Cl.
*G06K 9/00* (2006.01)
*H04N 19/597* (2014.01)
(Continued)

(52) U.S. Cl.
CPC ......... *H04N 19/597* (2014.11); *H04N 19/593* (2014.11); *H04N 19/70* (2014.11); *H04N 19/96* (2014.11); *H04N 13/161* (2018.05)

(58) Field of Classification Search
CPC .... H04N 19/597; H04N 19/593; H04N 19/70; H04N 19/96; H04N 19/463; H04N 19/105; H04N 19/184
See application file for complete search history.

(56) References Cited

U.S. PATENT DOCUMENTS 9,756,359 B2 * 9/2017 Zhao ................... H04N 19/597
2007/0030356 A1 * 2/2007 Yea .................... H04N 13/0242
348/207.99
(Continued)

OTHER PUBLICATIONS

Tech et al., "3D-HEVC Draft Text 4", Joint Collaborative Team on 3D Video Coding Extensions of ITU-T SG 16 WP 3 and ISO/IEC JTC 1/SC 29/WG 11, 8th Meeting: Valencia, ES, Mar. 2-Apr. 4, 2014, Document: JCT3V-H1001-v2, 40 pgs.
(Continued)

*Primary Examiner* — Ali Bayat
(74) *Attorney, Agent, or Firm* — Birch, Stewart, Kolasch & Birch, LLP

(57) ABSTRACT

Since the size of a lookup table necessary to retain a partition pattern list is large in DMM 1 prediction, it is difficult to dispose the lookup table in a cache. For this reason, access to an external memory occurs at each time of access to the lookup table, and thus a problem may occur in that a processing speed is lowered.
In the DMM 1 prediction, the lookup table for retaining a partition pattern of a first size is deleted, a partition pattern of a second size smaller than the first size is scaled to the first size, and the partition pattern of the first size is generated.

9 Claims, 23 Drawing Sheets

(51) Int. Cl.
  *H04N 19/70*     (2014.01)
  *H04N 19/593*    (2014.01)
  *H04N 19/96*     (2014.01)
  *H04N 13/161*    (2018.01)

(56) References Cited

U.S. PATENT DOCUMENTS

2012/0200669 A1* 8/2012 Lai ................. G06T 5/002
                                                 348/43
2016/0173900 A1* 6/2016 Lee ................ H04N 19/597
                                              375/240.08

OTHER PUBLICATIONS

Tsukuba et al., "Lookup table size reduction in DMM1", Joint Collaborative Team on 3D Video Coding Extensions of ITU-T SG 16 WP 3 and ISO/IEC JTC 1/SC 29/WG 11, 9th Meeting: Sapporo, JP, Jul. 3-9, 2014, Document: JCT3V-I0110, 9 pgs.

* cited by examiner

FIG. 4
(a)
| VPS | SPS#0 | SPS#1 | PPS#0 | PPS#1 | SEI | PICT #0 | PICT #1 |
(b)
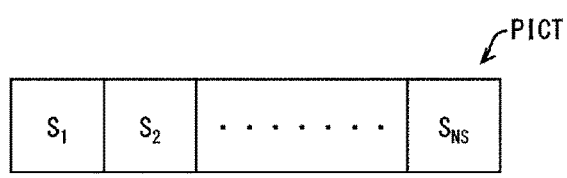
(c)
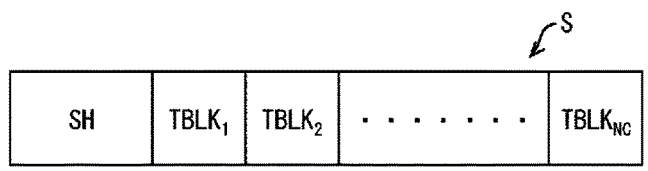
(d)
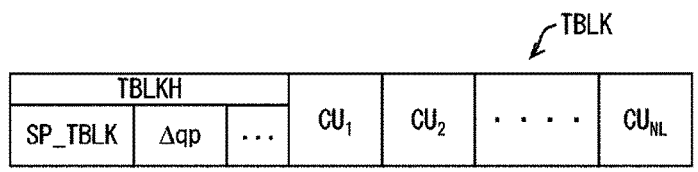
(e)
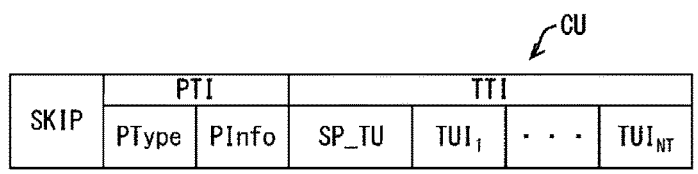

| coding_unit( x0, y0, log2CbSize, ctDepth ) { | Descriptor | |
|---|---|---|
| ... | | |
|   if( CuPredMode[ x0 ][ y0 ] = = MODE_INTRA ) { | | |
|     if( PartMode = = PART_2Nx2N && pcm_enabled_flag &&<br>      log2CbSize >= Log2MinIpcmCbSizeY &&<br>      log2CbSize <= Log2MaxIpcmCbSizeY ) | | |
|     ... | | |
|     pbOffset = ( PartMode = = PART_NxN ) ? ( nCbS / 2 ) : nCbS | | |
|     log2PbSize = log2CbSize - ( ( PartMode = = PART_NxN ) ? 1 : 0 ) | | |
|     for( j = 0; j < nCbS; j = j + pbOffset ) | | |
|       for( i = 0; i < nCbS; i = i + pbOffset ) { | | |
|         if ( vps_depth_modes_flag[ nuh_layar_id ] ) | | |
|           intra_mode_ext( x0 + i, y0 + j, log2PbSize ) | | ~SYN01 |
|         if( dim_not_present_flag[ x0 + i ][ y0 + j ] ) | | |
|           prev_intra_luma_pred_flag[ x0 + i ][ y0 + j ] | ae(v) | ~SYN02 |
|       } | | |
|     for( j = 0; j < nCbS; j = j + pbOffset ) | | |
|       for( i = 0; i < nCbS; i = i + pbOffset ) | | |
|         if( dim_not_present_flag[ x0 + i ][ y0 + j ] ) { | | |
|           if( prev_intra_luma_pred_flag[ x0 + i ][ y0 + j ] ) | | |
|             mpm idx [ x0 + i ][ y0 + j ] | ae(v) | ~SYN03 |
|           else | | |
|             rem_intra_luma_pred_mode[ x0 + i ][ y0 + j ] | ae(v) | ~SYN04 |
|         } | | |
|     ... | | |
|     } | | |
|   } else { | | |
|     cu_extension( x0, y0 ) | | |
|   ... | | |
| } | | |

(b)

| intra_mode_ext( x0, y0, log2PbSize ) { | Descriptor | |
|---|---|---|
|   if ( logPbSize < 6 ) | | |
|     dim_not _present_flag[ x0 ][ y0 ] | ae(v) | ~SYN01A |
|   if ( !dim_not _present_flag[ x0 ][ y0 ] ) | | |
|     depth_intra_mode_flag[ x0 ][ y0 ] | ae(v) | ~SYN01B |
|   if( DepthIntraMode[ x0 ][ y0 ] = = INTRA_DEP_DMM_WFULL ) | | |
|     wedge_full_tab_idx[ x0 ][ y0 ] | ae(v) | ~SYN01C |
| } | | |

FIG. 6

| cu_extension( x0 , y0 , log2CbSize ) { | Descriptor |
|---|---|
| ... | |
|   for( j = 0; j < nCbS; j = j + pbOffset ) | |
|     for( k = 0; k < nCbS; k = k + pbOffset ) | |
|       if( DmmFlag[ x0 + k ][ y0 + j ] ) { | |
|         if( CuPredMode[ x0 ][ y0 ] = = MODE_INTRA ) { | |
|           depth_dc_flag[ x0 + k ][ y0 + j ] | ae(v) |
|         dcNumSeg = 2 | |
|         ... | |
|         if( depth_dc_flag[ x0 + k ][ y0 + j ] ) | |
|           for( i = 0; i < dcNumSeg; i ++ ) { | |
|             depth_dc_abs[ x0 + k ][ y0 + j ][ i ] | ae(v) |
|             if ( depth_dc_abs[ x0 + k ][ y0 + j ][ i ] > 0 ) | |
|               depth_dc_sign_flag[ x0 + k ][ y0 + j ][ i ] | ae(v) |
|           } | |
|         } | |
|       } | |
| } | |

SYND1 → depth_dc_flag row
SYND2 → depth_dc_abs row
SYND3 → depth_dc_sign_flag row

FIG. 7

| Intra prediction mode (PredModeIntra) | Intra Prediction Method |
|---|---|
| 0 | INTRA_PLANAR |
| 1 | INTRA_DC |
| 2..34 | INTRA_ANGULAR (INTRA_ANGULAR2..INTRA_ANGULAR34) |
| 35 | INTRA_DMM_WFULL |
| 36 | INTRA_DMM_CREDTEX |

FIG. 9

DEFPM1

| NAME | PredModeIntra |
|------|---------------|
| Planar | 0 |
| DC | 1 |
| HOR+8 | 2 |
| HOR+7 | 3 |
| HOR+6 | 4 |
| HOR+5 | 5 |
| HOR+4 | 6 |
| HOR+3 | 7 |
| HOR+2 | 8 |
| HOR+1 | 9 |
| HOR | 10 |
| HOR-1 | 11 |
| HOR-2 | 12 |
| HOR-3 | 13 |
| HOR-4 | 14 |
| HOR-5 | 15 |
| HOR-6 | 16 |
| HOR-7 | 17 |

| NAME | PredModeIntra |
|------|---------------|
| VER-8 | 18 |
| VER-7 | 19 |
| VER-6 | 20 |
| VER-5 | 21 |
| VER-4 | 22 |
| VER-3 | 23 |
| VER-2 | 24 |
| VER-1 | 25 |
| VER | 26 |
| VER+1 | 27 |
| VER+2 | 28 |
| VER+3 | 29 |
| VER+4 | 30 |
| VER+5 | 31 |
| VER+6 | 32 |
| VER+7 | 33 |

FIG. 10

DEFANG1

MAIN DIRECTION IS HORIZONTAL
| predModeIntra | 2 | 3 | 4 | 5 | 6 | 7 | 8 | 9 |
|---|---|---|---|---|---|---|---|---|
| IntraPredAngle | 32 | 26 | 21 | 17 | 13 | 9 | 5 | 2 |

| predModeIntra | 10 | 11 | 12 | 13 | 14 | 15 | 16 | 17 |
|---|---|---|---|---|---|---|---|---|
| IntraPredAngle | 0 | -2 | -5 | -9 | -13 | -17 | -21 | -26 |

MAIN DIRECTION IS VERTICAL
| predModeIntra | 18 | 19 | 20 | 21 | 22 | 23 | 24 | 25 | 26 |
|---|---|---|---|---|---|---|---|---|---|
| IntraPredAngle | -32 | -26 | -21 | -17 | -13 | -9 | -5 | -2 | 0 |

| predModeIntra | 27 | 28 | 29 | 30 | 31 | 32 | 33 | 34 |
|---|---|---|---|---|---|---|---|---|
| IntraPredAngle | 2 | 5 | 9 | 13 | 17 | 21 | 26 | 32 |

FIG. 12
(A) YUV4:2:0, 8x8CU, PartType=NxN
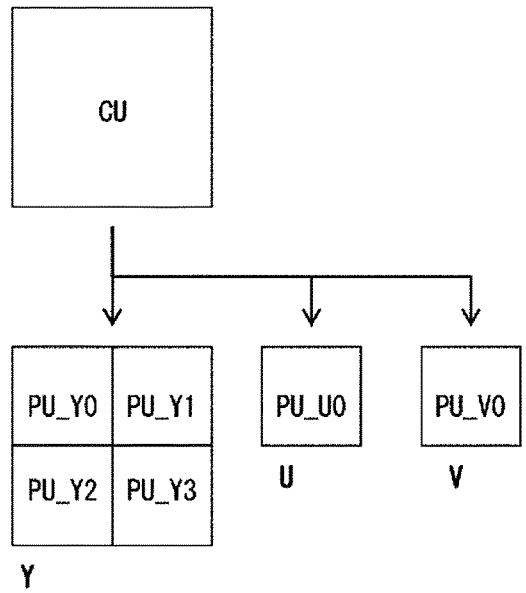
(B) YUV4:2:0, 16x16CU, PartType=2Nx2N
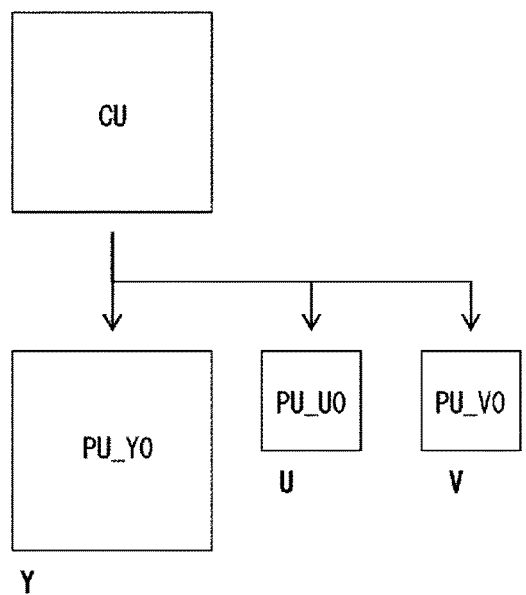

FIG. 13
(A) YUV4:0:0, 8x8CU, PartType=NxN
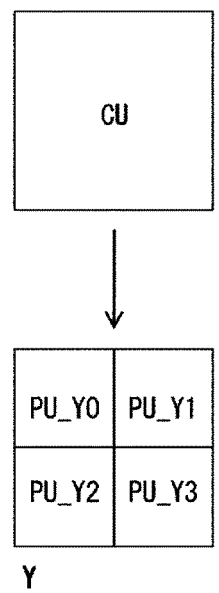
(B) YUV4:0:0, 16x16CU, PartType=2Nx2N
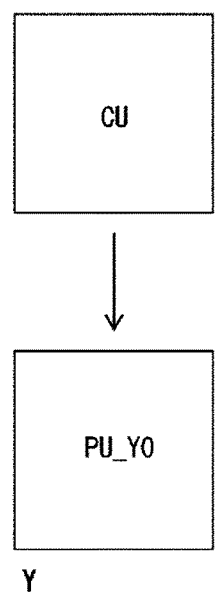

FIG. 16
(a)
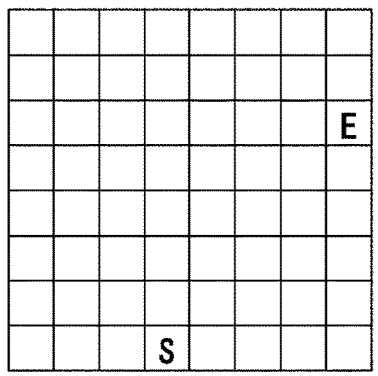
(b)
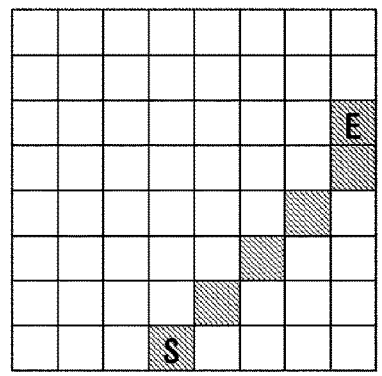
(c)
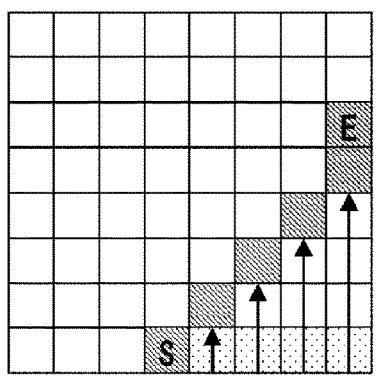
(d)
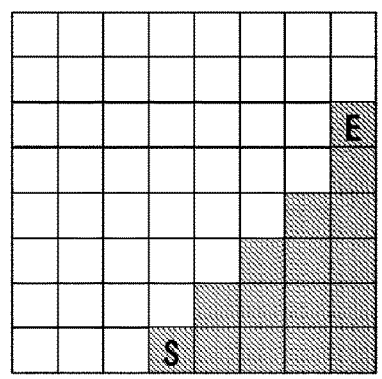

FIG. 18
(a)
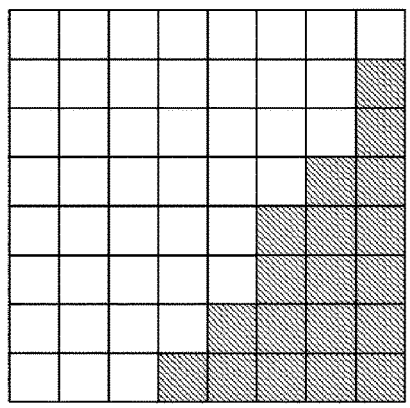
SCALING
(b)
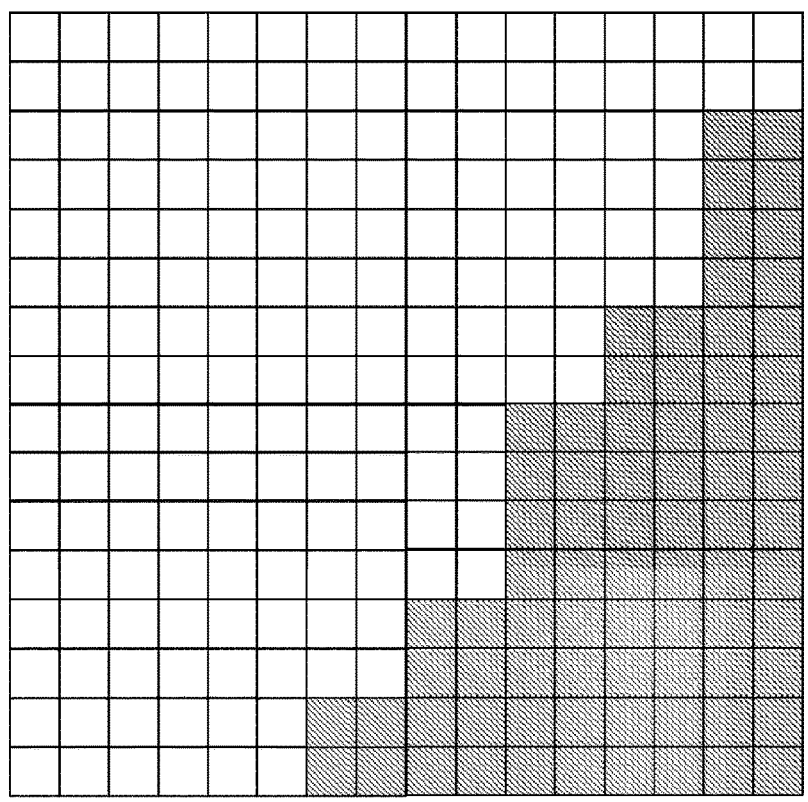

FIG. 19

(a) TECHNOLOGY OF RELATED ART

| PU size | Number of wedgelet pattern | Number of bits for one wedgelet pattern | Total bits | Accumulated bits | Bits ratio [%] compared to accumulated bits from 4×4 to 32×32 |
|---|---|---|---|---|---|
| 4×4 | 86 | 16 | 1,376 | 1,376 | 0.1% (=100*1376/1935072) |
| 8×8 | 766 | 64 | 46,024 | 50,400 | 2.4% (=100*46024/1935072) |
| 16×16 | 1,350 | 256 | 345,600 | 396,000 | 17.9% (=100*345600/1935072) |
| 32×32 | 1,503 | 1,024 | 1,539,072 | 1,935,072 | 79.5% (=100*1539072/1935072) |

(b) EMBODIMENT: nBS=16

| PU size | Number of wedgelet pattern | Number of bits for one wedgelet pattern | Total bits | Accumulated bits | Bits ratio [%] |
|---|---|---|---|---|---|
| 4×4 | 86 | 16 | 1,376 | 1,376 | — |
| 8×8 | 766 | 64 | 46,024 | 50,400 | — |
| 16×16 | 1,350 | 256 | 345,600 | 396,000 | — |
| 32×32 | 1,350 | — | — | 396,000 | 20.5% (=100*396,000/1935,072) |

(c) EMBODIMENT: nBS=8

| PU size | Number of wedgelet pattern | Number of bits for one wedgelet pattern | Total bits | Accumulated bits | Bits ratio [%] |
|---|---|---|---|---|---|
| 4×4 | 86 | 16 | 1,376 | 1,376 | — |
| 8×8 | 766 | 64 | 46,024 | 50,400 | — |
| 16×16 | 766 | — | — | 50,400 | — |
| 32×32 | 766 | — | — | 50,400 | 2.5% (=100*50,400/1935,072) |

FIG. 20
(a) vertEdgeFlag=0, horEdgeFlag=0
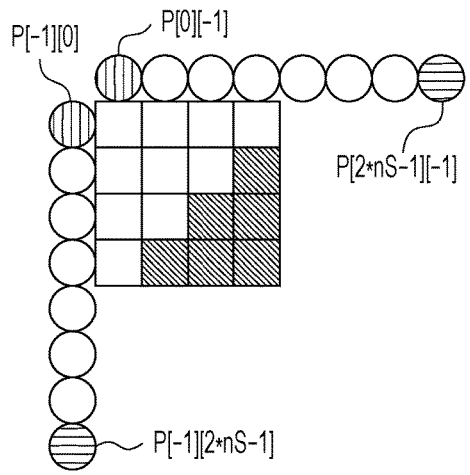
(b) vertEdgeFlag=1, horEdgeFlag=0
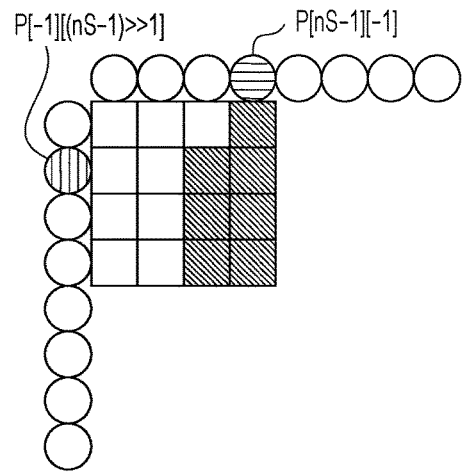
(c) vertEdgeFlag=0, horEdgeFlag=1
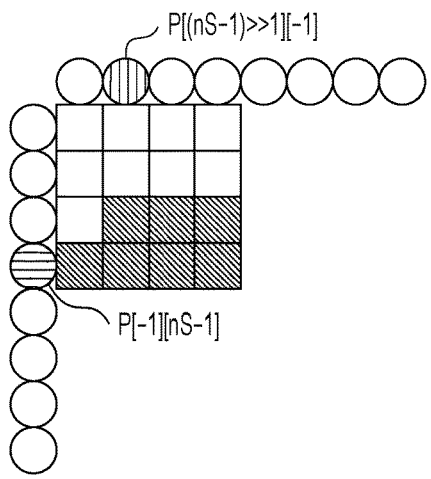
(d) vertEdgeFlag=1, horEdgeFlag=1
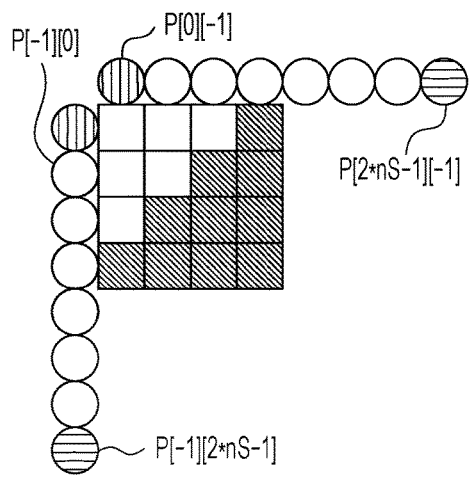
REFERENCE PIXEL USED TO GENERATE dcValLT
REFERENCE PIXEL USED TO GENERATE dcValBR FIG. 22
(a)
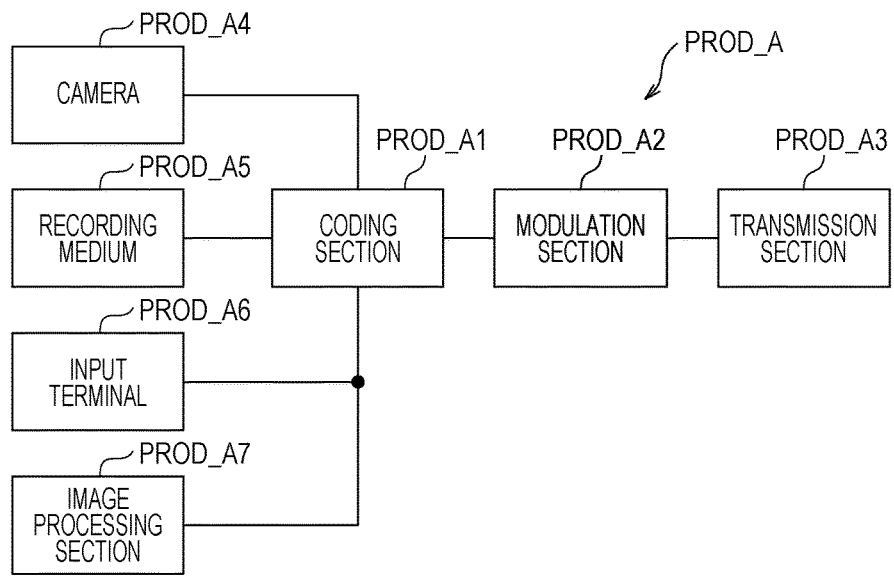
(b)
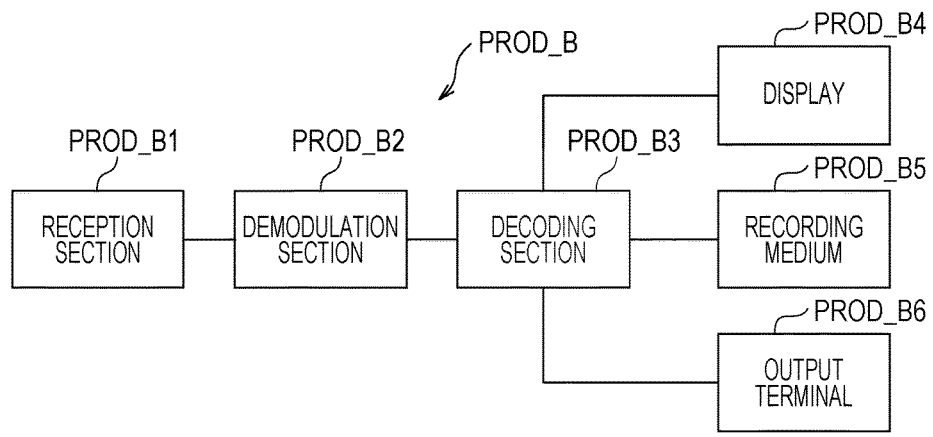

FIG. 23
(a)
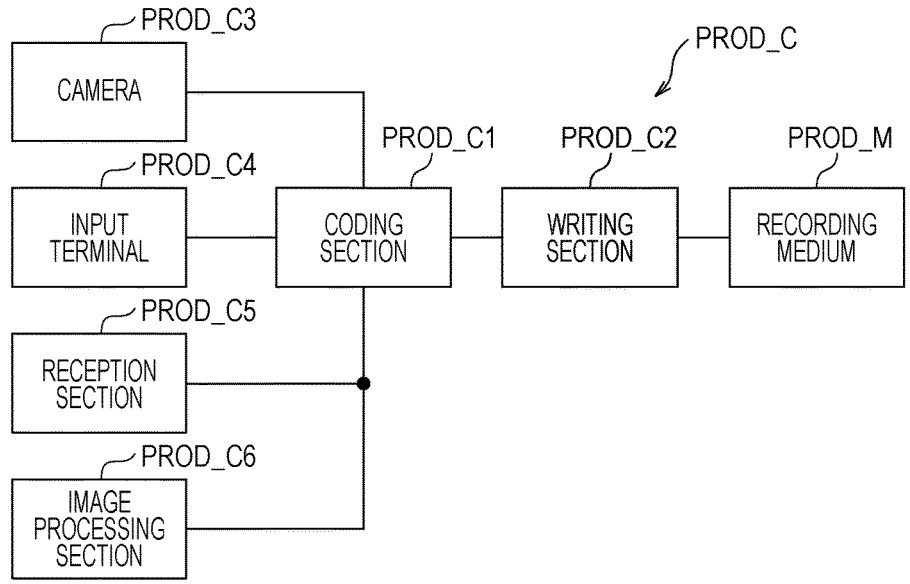
(b)
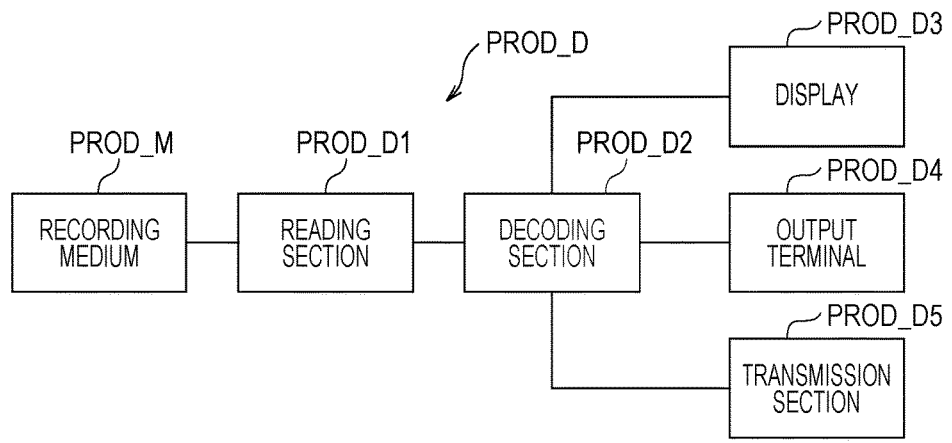

DMM PREDICTION SECTION, IMAGE DECODING DEVICE, AND IMAGE CODING DEVICE

TECHNICAL FIELD

The present invention relates to an image decoding device decoding coded data indicating an image and an image coding device generating coded data by coding an image.

BACKGROUND ART

In image coding techniques for multiple-viewpoint images, disparity prediction coding that reduces the amount of information by predicting disparity between images at the time of coding of multiple-viewpoint images and decoding methods corresponding to the coding methods have been proposed. A vector indicating disparity between viewpoint images is referred to as a disparity vector. A disparity vector is a 2-dimensional vector that has a component (x component) in the horizontal direction and a component (y component) in the vertical direction and is calculated for each block which is a region obtained by partitioning one image. To acquire multiple-viewpoint images, it is general to use cameras disposed at respective viewpoints. In coding for multiple-viewpoint images, viewpoint images are coded as different layers in a plurality of layers. A coding method for a moving image formed in a plurality of layers is generally referred to as scalable coding or hierarchical coding. In scalable coding, high coding efficiency is realized by executing prediction between layers. A layer serving as a standard layer, which is not used in prediction between layers, is referred to as a base layer and other layers are referred to as enhancement layers. In a case where layers are formed from viewpoint images, scalable coding is referred to as view scalable coding. At this time, a base layer is also referred to as a base view and an enhancement layer is also referred to as a non-base view. Further, in addition to view scalable coding, scalable coding is referred to as 3-dimensional scalable coding in a case where layers are formed from a texture layer (image layer) of textures (images) and a depth layer (distance image layer) of a depth map (distance image).

For example, NPL 1 discloses a 3-dimensional scalable coding technique of an HEVC base. In NPL 1, in order to code a depth map efficiently, there is a depth coding tool such as depth modeling mode (DMM) prediction (also referred to as depth intra prediction).

In the DMM prediction, a target block (also referred to as a depth block) on a depth map is based on a depth model that is configured by two nonrectangular flat regions and in which a depth value of each flat region is expressed with a fixed value. The depth model is configured by partition information indicating a region to which each pixel belongs and depth value information regarding each region.

In the DMM prediction, there are two types of different partition types, that is, wedgelet partition and contour partition, as depth block partition methods. NPL 1 discloses a technique for retaining partition patterns (wedgelet patterns) of wedgelet partitions in a lookup table defined in advance for each block size, selecting the partition pattern designated by an identifier (partition pattern index wedge_full_tab_idx) designating the partition pattern, partitioning a depth block into two regions based on the selected partition pattern, and predicting a depth value for each of the partitioned regions.

CITATION LIST

Non Patent Literature

NPL 1: "3D-HEVC Draft Text 4 (JCT3V-H1001)," Joint Collaborative Team on 3D Video Coding Extension Development of ITU-T SG16 WP3 and ISO/IEC JTC1/SC29/WG11 8th Meeting: Valencia, E S, 29 Mar. to 4 Apr. 2014 (published on 14 May 2014)

SUMMARY OF INVENTION

Technical Problem

In the DMM prediction based on the wedgelet partition in NPL 1, however, there is a problem in that the size of the lookup table is very large since it is necessary to retain the partition patterns with block sizes (4×4 to 32×32) in the lookup table (partition pattern list) in advance. In particular, the size of the 32×32 partition pattern occupies 80% of the total size of the lookup table. For this reason, it is difficult to dispose the lookup table in a cache, and access to an external memory occurs at each time of access to the lookup table, and thus a problem that a processing speed is lowered may occur.

The invention has been devised in view of the foregoing problems and an object of the invention is to realize an image decoding device and the like capable of considerably reducing the size of a memory retaining partition patterns while maintaining coding efficiency by deleting a lookup table for retaining a partition pattern of a first size, scaling a partition pattern of a second size smaller than the first size to the first size to generate the partition pattern of the first size in DMM 1 prediction.

Solution to Problem

In order to resolve the foregoing problems, according to Aspect 1 of the invention, there is provided a DMM prediction section including: a DMM 1 partition pattern generation section that derives a partition pattern to be applied to a target PU; and a DC prediction value derivation section that derives a prediction value of each region in the target PU based on the partition pattern derived by the DMM 1 partition pattern generation section, a decoded pixel adjacent to the target PU, and DC offset information of each region in the target PU specified by the partition pattern. The DMM 1 partition pattern generation section derives the partition pattern to be applied to the target PU based on a target PU size, a standard partition pattern size, a partition pattern index for designating the partition pattern to be applied to the target PU, and a partition pattern list.

Advantageous Effects of Invention

According to an aspect of the invention, it is possible to obtain the advantageous effect of reducing the size of a memory necessary to retain a partition pattern of a first size while maintaining coding efficiency by scaling a partition pattern of a second size smaller than the first size to the first size, and generating the partition pattern of the first size in DMM 1 prediction.

BRIEF DESCRIPTION OF DRAWINGS

FIG. 4 is a diagram illustrating a data structure of coded data generated by a moving image coding device and decoded by the moving image decoding device according to the embodiment of the invention, and FIGS. 4(a) to 4(e) are diagrams illustrating a sequence layer, a picture layer, a slice layer, a tree block layer, and a CU layer, respectively.

FIG. 5 is a diagram illustrating an example of a syntax included in the CU layer, FIG. 5(a) illustrates an example of a syntax table related to intra CU, and FIG. 5(b) illustrates an example of a syntax table related to intra-prediction mode extension.

FIG. 6 is a diagram illustrating an example of a syntax related to DC offset information included in the CU layer.

FIG. 7 is a diagram illustrating an example of a prediction mode number corresponding to classification of intra prediction method used in the moving image decoding device.

FIG. 9 is a diagram illustrating an example of prediction mode definition which is definition corresponding to an intra prediction method and a prediction mode number.

FIG. 10 is a table illustrating an example of a correspondence relation between a prediction mode identifier and a value of a gradient intraPredAngle.

FIG. 12 is a diagram illustrating a setting procedure of a PU and the PU included in the CU in a case where a input image (for example, viewpoint image) has a YUV format of 4:2:0, FIG. 12(A) is a diagram illustrating the PU in the CU in a case where the size of a target CU is an 8×8 pixel and a partition type is N×N, and FIG. 12(B) is a diagram illustrating the PU in the CU in a case where the size of a target CU is a 16×16 pixel and a partition type is 2N×2N.

FIG. 13 is a diagram illustrating a setting procedure of a PU and the PU included in the CU in a case where a input image (for example, a depth map) has a YUV format of 4:0:0, FIG. 13(A) is a diagram illustrating the PU in the CU in a case where the size of a target CU is an 8×8 pixel and a partition type is N×N, and FIG. 13(B) is a diagram illustrating the PU in the CU in a case where the size of a target CU is a 16×16 pixel and a partition type is 2N×2N.

FIG. 15(a) illustrates an example of an edge boundary of an object on a block, FIG. 15(b) illustrates an example of a partition pattern (wedgePattern) indicating that the block is partitioned into two regions (P1 and P2) along the edge boundary of the object, and FIG. 15(c) illustrates an example in which prediction values are allocated to the partitioned regions.

FIG. 16 is a diagram illustrating a method of generating the partition pattern based on wedgelet partition (DMM 1) in the DMM prediction, FIG. 16(a) illustrates an example of a starting point S and an ending point E on a block, FIG. 16(b) illustrates an example of a line segment connecting the starting point S and the ending point E, and FIG. 16(c) is a functional block diagram illustrating a configuration example of a variable-length decoding section included in the moving image decoding device on the bottom right side of the line segment.

FIG. 17(a) illustrates an example of a partition pattern of wedgeOri=0, FIG. 17(b) illustrates an example of a partition pattern of wedgeOri=1, FIG. 17(c) illustrates an example of a partition pattern of wedgeOri=2, FIG. 17(d) illustrates an example of a partition pattern of wedgeOri=3, FIG. 17(e) illustrates an example of a partition pattern of wedgeOri 4, and FIG. 17(f) illustrates an example of a partition pattern of wedgeOri=5.

FIG. 18 is a diagram illustrating examples of partition patterns generated by a DMM 1 partition pattern derivation section according to the invention, FIG. 18(a) illustrates an example of a partition pattern in a case where a standard partition pattern size is 8×8, and FIG. 18(b) illustrates an example of a partition pattern obtained by scaling the partition pattern illustrated in FIG. 18(a) to 16×16.

FIG. 19 is a diagram illustrating an advantageous effect related to the DMM 1 partition pattern generation section according to the invention, FIG. 19(a) illustrates the size of a lookup table related to a partition pattern according to a comparative example, FIG. 19(b) illustrates the size of the lookup table related to the partition pattern in a case where a standard partition pattern size nBS=16 is set according to the embodiment, and FIG. 19(c) illustrates the size of the lookup table related to a partition pattern in a case where the standard partition pattern size nBS=8 is set according to the embodiment.

FIG. 20 is a diagram illustrating a method of deriving DC prediction values according to combinations of a vertical edge flag vertEdgeFlag and a horizontal edge flag horEdgeFlag in a DC prediction value derivation section according to the invention, FIG. 20(a) illustrates an example of (vertEdgeFlag, horEdgeFlag)=(0, 0), FIG. 20(b) illustrates an example of (vertEdgeFlag, horEdgeFlag)=(1, 0), FIG. 20(c) illustrates an example of (vertEdgeFlag, horEdgeFlag)=(0, 1), and FIG. 20(d) illustrates an example of (vertEdgeFlag, horEdgeFlag)=(1, 1).

FIG. 22 is a diagram illustrating the configuration of a transmission apparatus on which the moving image coding device is mounted and the configuration of a reception apparatus on which the moving image decoding device is mounted, FIG. 22(a) illustrates the transmission apparatus on which the moving image coding device is mounted, and FIG. 22(b) illustrates the reception apparatus on which the moving image decoding device is mounted.

FIG. 23 is a diagram illustrating the configuration of a recording apparatus on which the moving image coding device is mounted and the configuration of a reproduction apparatus on which the moving image decoding device is mounted, FIG. 23(a) illustrates the recording apparatus on which the moving image coding device is mounted, and FIG. 23(b) illustrates the reproduction apparatus on which the moving image decoding device is mounted.

DESCRIPTION OF EMBODIMENTS

[Overview]

Hereinafter, an embodiment of the present invention will be described with reference to the drawings.

Figure 2:
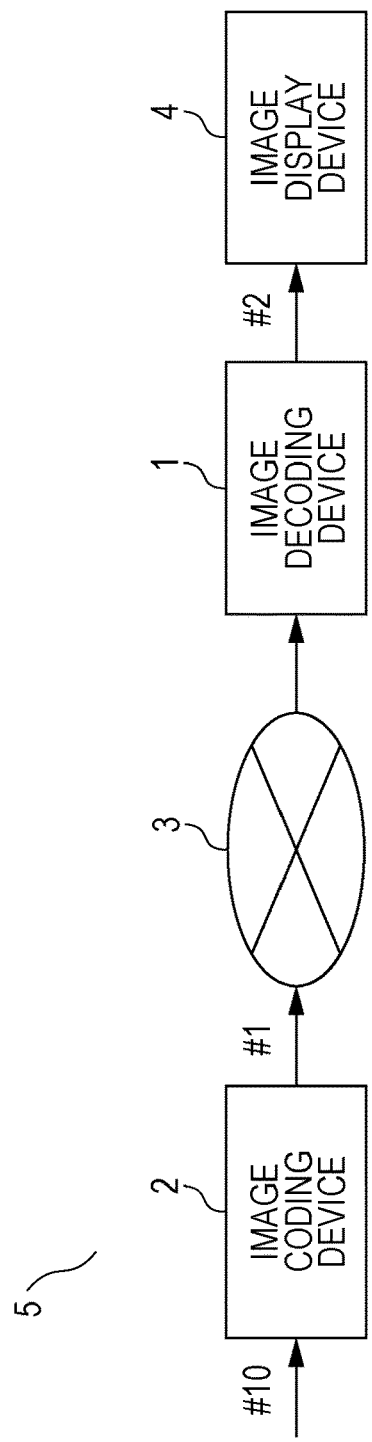
FIG. 2 is a schematic diagram illustrating the configuration of an image transmission system according to an embodiment of the invention.

FIG. 2 is a schematic diagram illustrating the configuration of an image transmission system 5 according to the embodiment.

The image transmission system 5 is a system that transmits codes obtained by coding a plurality of layer images and displays images obtained by decoding the transmitted codes. The image transmission system 5 is configured to include an image coding device 2, a network 3, an image decoding device 2, and an image display device 4.

Signals T indicating a plurality of layer images (also referred to as texture images) are input to the image coding device 2. The layer images are images viewed or captured at certain resolutions and certain viewpoints. In a case where view scalable coding of coding a 3-dimensional image using a plurality of layer images is executed, each of the plurality of layer images is referred to as a viewpoint image. Here, the viewpoint corresponds to an observation point or the position of an imaging device. For example, a plurality of viewpoint images are images obtained when right and left imaging devices image a subject. The image coding device 2 codes the signals to generate coded data #1. The details of the coded data #1 will be described later. The viewpoint image is a 2-dimensional image (planar image) observed at a certain viewpoint. The viewpoint image is expressed with, for example, a luminance value or a color signal value of each of the pixels arrayed in a 2-dimensional plane.

Hereinafter, one viewpoint image or a signal indicating the viewpoint image is referred to as a picture. In a case where spatial scalable coding is executed using a plurality of layer images, the plurality of layer images are formed of a base layer image with a low resolution and enhancement layer images with high resolutions. In a case where SNR scalable coding is executed using a plurality of layer images, the plurality of layer images are formed of a base layer image with low quality and enhancement layer images with high quality. The view scalable coding, the spatial scalable coding, and the SNR scalable coding may be combined arbitrarily. In the embodiment, coding and decoding of images including at least a base layer image and images (enhancement layer images) other than the base layer image as a plurality of layer images are treated. An image on a referred side in two layers having a reference relation (dependency relation) in images or coding parameters among a plurality of layers is referred to as a first layer image and an image on a referring side is referred to as a second layer image. For example, in a case where there is an enhancement layer image (other than a base layer) coded referring to the base layer, the base layer image is treated as the first layer image and an enhancement layer image is treated as a second layer image. As an example of the enhancement layer image, there is a viewpoint image or a depth image other than a base view.

For example, a viewpoint image is indicated by a luminance value or a color signal value for each of the pixels disposed in a 2-dimensional plane. A depth map (also referred to as a "depth image", or a "distance image") is a signal value (referred to as a "depth value" or a "depth") corresponding to a distance of a subject or a background contained in an object plane from a viewpoint (an imaging device or the like) and is an image signal formed from a signal value (pixel value) of each of the pixels arrayed in a 2-dimensional plane. The pixels forming a depth map correspond to the pixels forming a viewpoint image. Accordingly, the depth map serves as a clue for expressing a 3-dimensional object plane using a viewpoint image which is an image signal serving as a standard in which an object plane is projected to a 2-dimensional plane.

The network 3 transmits the coded data #1 generated by the image coding device 2 to the image decoding device 1. The network 3 is the Internet, a wide area network (WAN), a local area network (LAN), or a combination thereof. The network 3 is not necessarily limited to a bi-directional communication network, but may be a uni-directional or bi-directional communication network in which broadcast waves of terrestrial digital broadcast or satellite broadcast are transmitted. The network 3 may be substituted with a storage medium that stores the coded data #1, such as a digital versatile disc (DVD) or a Blue-ray (BD) disc.

The image decoding device 1 decodes the coded data #1 transmitted by the network 3 to generate a plurality of decoded layer images Td (decoded viewpoint images TexturePic and a decoded depth map DepthPic) and outputs the decoded data.

The image display device 4 displays some or all of the plurality of decoded layer images Td generated by the image decoding device 1. For example, in the view scalable coding, in the case where all of the decoded layer images are displayed, 3-dimensional images (stereoscopic images) or free viewpoint images are displayed. In the case where some of the decoded layer images are displayed, 2-dimensional images are displayed. The image display device 4 includes, for example, a display device such as a liquid crystal display or an organic electro-luminescence (EL) display. In the spatial scalable coding and the SNR scalable coding, in a case where the image decoding device 1 and the image display device 4 have a high processing capability, enhancement layer images with high quality are displayed. In a case where the image decoding device 1 and the image display device 4 have a lower processing capability, base layer images for which a high processing capability or display capability is not necessary in an enhancement layer are displayed.

Figure 3:
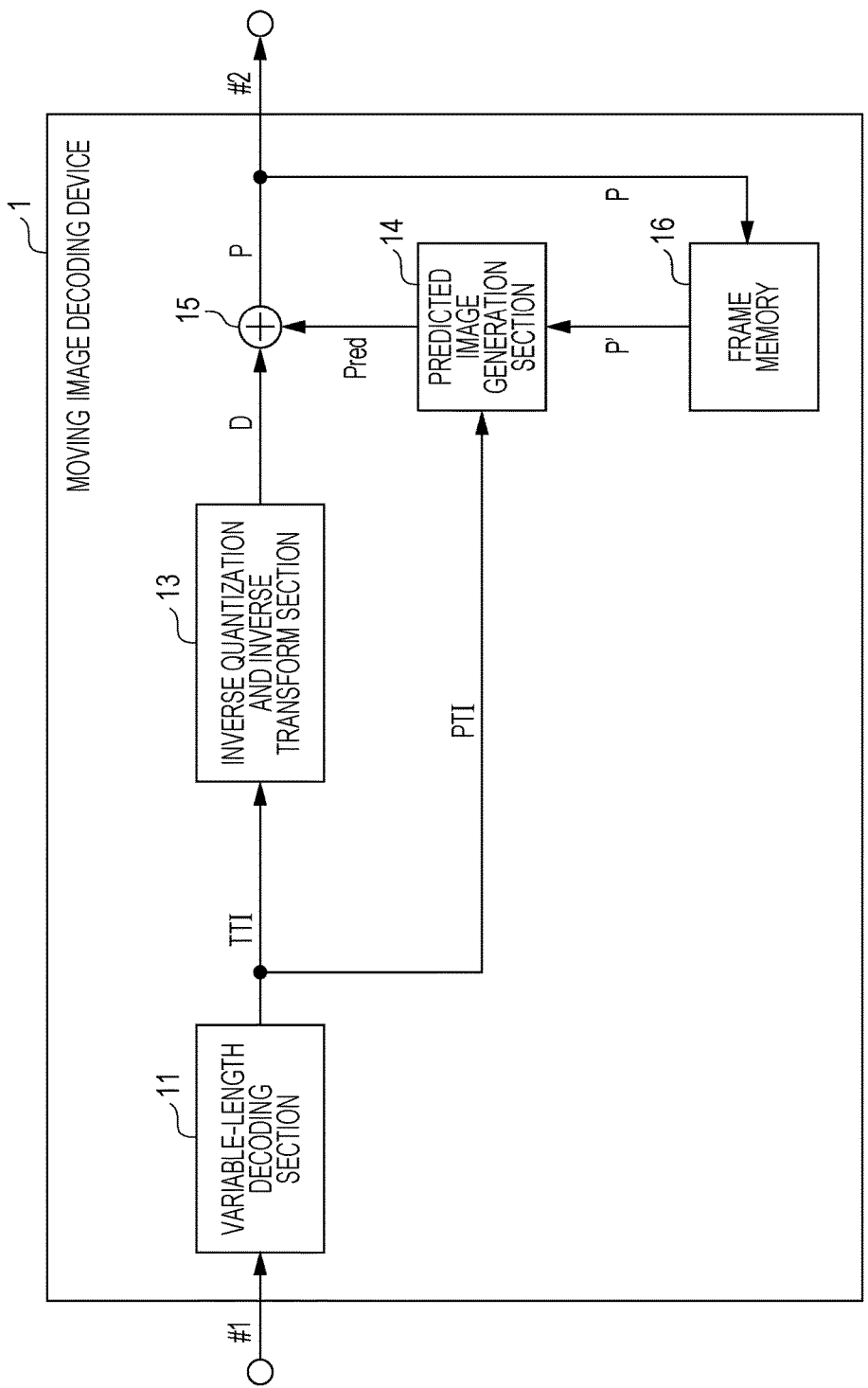
FIG. 3 is a functional block diagram illustrating a schematic configuration of a moving image decoding device according to the embodiment.

Hereinafter, the image decoding device 1 and the image coding device 2 according to an embodiment of the invention will be described with reference to FIGS. 1 to 21. FIG. 3 is a functional block diagram illustrating a schematic configuration of the image decoding device 1.

The coded data #1 obtained when the moving image coding device 2 codes a layer image (one viewpoint image TexturePic or a plurality of viewpoint images TexturePic and a depth map DepthPic of the same time corresponding to the viewpoint image TexturePic) is input to the moving image decoding device 1. The moving image decoding device 1 decodes the input coded data #1 and outputs layer image #2 (one viewpoint image TexturePic or a plurality of viewpoint images TexturePic and the depth map (DepthPic) of the same time corresponding to the viewpoint image TexturePic) to the outside. The structure of the coded data #1 will be described below before detailed description of the moving image decoding device 1.

[Structure of Coded Data]

An example of the structure of the coded data #1 generated by the moving image coding device 2 and decoded by the moving image decoding device 1 will be described with reference to FIG. 4. The coded data #1 includes a sequence and a plurality of pictures included in the sequence, for example.

The structure of hierarchy of the sequence layer and the lower layers in the coded data #1 is illustrated in FIG. 4. FIGS. 4(a) to 4(e) are diagrams illustrating a sequence layer that defines a sequence SEQ, a picture layer that defines a picture PICT, a slice layer that defines a slice S, a tree block layer that defines a tree block (Tree Block: also referred to as a Coding Tree Unit) TBLK, and a coding unit (CU) layer that defines a CU included in the tree block TBLK, respectively.

(Sequence Layer)

In the sequence layer, a set of data referred to by the moving image decoding device 1 is defined to decode a processing target sequence SEQ (hereinafter also referred to as a target sequence). As illustrated in FIG. 4(a), the sequence SEQ includes a video parameter set, a sequence parameter set SPS, a picture parameter set PPS, pictures PICT, and supplemental enhancement information SEI. Here, a value shown after # indicates a layer ID. FIG. 4 illustrates an example in which there are coded data of #0 and #1, that is, layers 0 and 1, but the types of layers and the number of layers are not limited thereto.

The video parameter set VPS defines a set of coding parameters common to a plurality of moving images in regard to a moving image formed by a plurality of layers and a set of coding parameters related to the plurality of layers included in the moving image and the individual layer.

The sequence parameter set SPS defines a set of coding parameters referred to by the moving image decoding device 1 to decode a target sequence. For example, the width or height of a picture is defined.

In the picture parameter set PPS, a set of coding parameters referred to by the moving image decoding device 1 is defined to decode each picture in the target sequence. For example, a standard value (pic_init_qp_minus26) of a quantization width used to decode a picture or a flag (weighted_pred_flag) indicating application to weighted prediction. There are the plurality of PPSs. In this case, one of the plurality of PPSs is selected from the pictures in the target sequence.

(Picture Layer)

In the picture layer, a set of data referred to by the moving image decoding device 1 is defined to decode a processing target picture PICT (hereafter also referred to as a target picture). As illustrated in FIG. 4(b), the picture PICT includes picture headers PH and slices $S_1$ to $S_{NS}$ (where NS is a total number of slices included in the picture PICT).

In a case where it is not necessary to distinguish the slices $S_1$ to $S_{NS}$ from each other, the slices are sometimes described below by omitting the subscripts of the codes. The same also applies to data which is data included in the coded data #1 to be described below and is other data to which subscripts are appended.

A picture header PH includes a coding parameter group referred to by the moving image decoding device 1 to decide a method of decoding a target picture. For example, the standard value (pic_init_qp_minus26) in the picture in a step of quantizing prediction residual is an example of the coding parameter included in the picture header PH.

The picture header PH is also referred to as a picture parameter set (PPS).

(Slice Layer)

In the slice layer, a set of data which is referred to by the moving image decoding device 1 to decode a processing target slice S (also referred to as a target slice) is defined. As illustrated in FIG. 4(c), the slice S includes a slice header SH and tree blocks $TBLK_1$ to $TBLK_{NC}$ (where NC is a total number of tree blocks included in the slice S).

The slice header SH include a coding parameter group which is referred to by the moving image decoding device 1 to decide a target slice decoding method. Slice type designation information (slice_type) designating a type of slice is an example of a coding parameter included in the slice header SH.

As the types of slices which can be designated by the slice type designation information, (1) an I slice in which only intra-prediction is used at the time of coding, (2) a P slice in which uni-directional prediction or intra-prediction are used at the time of coding, and (3) a B slice in which uni-directional prediction, bi-directional prediction, or intra-prediction is used at the time of coding can be exemplified.

(Tree Block Layer)

In the tree block layer, a set of data referred to by the moving image decoding device 1 is defined to decode a processing target tree block TBLK (hereinafter referred to as a target tree block).

The tree block TBLK includes a tree block header TBLKH and coding unit information $CU_1$ to $CU_{NL}$ (where NL is a total number of pieces of coding unit information included in the tree block TBLK). First, a relation between the tree block TBLK and the coding unit information CU will be described here below.

The tree block TBLK is partitioned into intra-prediction or inter-prediction and a unit for specifying a block size for each process of transform.

The foregoing unit of the tree block TBLK is partitioned by recursive quadtree partition. A tree structure obtained by the recursive quadtree partition is referred to as a coding tree below.

Hereinafter, a unit corresponding to a leaf which is a node at the termination of the coding tree is referred as a coding node. Since the coding node is a basic unit of a coding process, the coding node is also referred to as a coding unit (CU).

That is, the pieces of coding unit information (hereinafter referred to as CU information) $CU_1$ to $CU_{NL}$ are information corresponding to coding nodes (coding units) obtained by executing the recursive quadtree partition on the tree block TBLK.

The root of the coding tree is associated with the tree block TBLK. In other words, the tree block TBLK is associated with the most significant node of the tree structure of the quadtree partition recursively including a plurality of coding nodes.

The size of each coding node is half of the horizontal and vertical sizes of a coding node to which the coding node directly belongs (that is, a unit of an immediately upper node of this coding node).

A size which each coding node can have depends on the size of the tree block and size designation information of a coding node included in the sequence parameter set SPS of the coded data #1. Since the tree block becomes the root of the coding node, the maximum size of the coding node is the size of the tree block. Since the maximum size of the tree block is identical to the maximum size of the coding node (CU), a largest CU (LCU) is used as the name of the tree block in some cases. For the minimum size, for example, a minimum coding node size (log 2_min_coding_block_size_minus3) and a difference (log_2_diff_max_min_coding_block_size) between the maximum and minimum coding node sizes are used as size designation information. In general setting, size designation information regarding a coding node in which the maximum coding node size is 64×64 pixels and the minimum coding node size is 8×8 pixels is used. In this case, the sizes of the coding node and the coding unit CU are one of 64×64 pixels, 32×32 pixels, 16×16 pixels, and 8×8 pixels.

(Tree Block Header)

The tree block header TBLKH includes a coding parameter which is referred to by the moving image decoding device 1 to decide a method of decoding a target tree block. Specifically, as illustrated in FIG. 4(d), the tree block header TBLKH includes tree block partition information SP_TBLK for designating a partition pattern of the target tree block into each CU and a quantization parameter difference Δqp (qp_delta) for designating the magnitude of a quantization step.

The tree block partition information SP_TBLK is information indicating a coding tree for partitioning a tree block. Specifically, the tree block partition information SP_TBLK is information for designating the shape and size of each CU included in the target tree block and the position of each CU in the target tree block.

The tree block partition information SP_TBLK may not explicitly include the shape or size of the CU. For example, the tree block partition information SP_TBLK may be a set of flags (split_coding_unit_flag) indicating whether to execute quad-partition on an entire target tree block or a partial region of the tree block. In this case, by using the shape or size of the tree block together, it is possible to specify the shape or size of each CU.

The quantization parameter difference Δqp is a difference qp−qp' between a quantization parameter qp in a target tree block and a quantization parameter qp' in a tree block coded immediately before the target tree block.

(CU Layer)

In the CU layer, a set of data referred to by the moving image decoding device 1 is defined to decode a processing target CU (hereinafter referred to as a target CU).

Here, a tree structure of data included in the CU will be described before description of detailed content of the data included in CU information CU. The coding node is a node of the root of a prediction tree (PT) and a transform tree (TT). The prediction tree and the transform tree will be described below.

In the prediction tree, the coding unit is partitioned into one prediction block or a plurality of prediction blocks and the position and size of each prediction block are defined. In other words, the prediction block is a region included in the coding unit and one or plurality of regions which do not overlap with each other. The prediction tree includes one prediction block or a plurality of prediction blocks obtained through the above-described partition.

The prediction process is executed for each prediction block. Hereinafter, the prediction block which is a unit of prediction is referred to as a prediction unit (PU).

Roughly speaking, there are two types of partition in the prediction tree in the case of intra-prediction and the case of inter-prediction.

In the case of intra-prediction, there are 2N×2N (which is the same size of the coding unit) and N×N partition methods.

In the case of inter-prediction, there are 2N×2N (which is the same size of the coding unit), 2N×N, N×2N, and N×N partition methods.

In the transform tree, the coding unit is partitioned into one transform block or a plurality of transform blocks and the position and size of each transform block are defined. In other words, the transform block is one or plurality of regions which are included in the coding node and do not overlap with each other. The transform tree includes one transform block or a plurality of transform blocks obtained through the above-described partition.

A transform process is executed for each transform block. Hereinafter, the transform block which is a unit of transform is referred to as a transform unit (TU).

(Data Structure of CU Information)

Next, specific content of data included in the CU information CU will be described with reference to FIG. 4(e). As illustrated in FIG. 4(e), specifically, the CU information CU includes a skip flag SKIP, PT information PTI, and TT information TTI.

The skip flag SKIP is a flag indicating whether a skip mode is applied to a target PU. In a case where a value of the skip flag SKIP is 1, that is, a case where the skip mode is applied to the target CU, the PT information PTI and the TT information TTI in the CU information CU are omitted. The skip flag SKIP is omitted in an I slice.

The PT information PTI is information regarding the PT included in the CU. In other words, the PT information PTI is a set of information regarding one PU or the plurality of PUs included in the PT and is referred to when a predicted image is generated by the moving image decoding device 1. The PT information PTI includes prediction type information PType and prediction information PInfo, as illustrated in FIG. 4(d).

The prediction type information PType is information for designating use of the intra-prediction or use of the inter-prediction as a predicted image generation method for the target PU.

The prediction information PInfo is configured by intra-prediction information or inter-prediction information according to which prediction mode is designated by the prediction type information PType. Hereinafter, the PU applied to the intra-prediction is referred to as an intra-PU and the PU applied to the inter-prediction is referred to as an inter-PU.

The prediction information PInfo includes information for designating the shape, size, and position of the target PU. As described above, a predicted image is generated using the PU as a unit. The details of the prediction information PInfo will be described later.

The TT information TTI is information regarding the TT included in the CU. In other words, the TT information TTI is a set of information regarding one TU or the plurality of TUs included in the TT and is referred to when residual data is decoded by the moving image decoding device 1. Hereinafter, the TU is referred to as a transform block in some cases.

As illustrated in FIG. 4(d), the TT information TTI includes TT partition information SP_TU for designating a partition pattern of the target CU into transform blocks and pieces of TU information $TUI_1$ to $TUI_{NT}$ (where NT is a total number of transform blocks included in the target CU).

Specifically, the TT partition information SP_TU is information for deciding the shape and size of each TU included in the target CU and the position of the TU in the target CU. For example, the TT partition information SP_TU can be realized from information (split_transform_unit_flag) indicating whether a target node is partitioned and information (trafoDepth) indicating depth of the partition.

For example, in a case where the size of the CU is 64×64, each TU obtained through the partition can have sizes from 32×32 pixels to 4×4 pixels.

The TU partition information SP_TU includes information indicating whether there is a non-zero transform coefficient in each TU. For example, information (CBP: Coded Block Flag) indicating whether there is the non-zero coefficient in the individual TU or information (no_residual_ data_flag) indicating whether there is the non-zero coefficient in the plurality of TUs is included in the TU partition information SP_TU.

The pieces of TU information $TUI_1$ to $TUI_{NT}$ are individual information regarding one TU or the plurality of TUs included in the TT. For example, the TU information TUI includes a quantization prediction residual.

Each quantization prediction residual is coded data that is generated when the moving image coding device 2 executes the following processes 1 to 3 on a target block which is a processing target block.

Process 1: a prediction residual obtained by subtracting a predicted image from a coding target image is subjected to discrete cosine transform (DCT transform);

Process 2: a transform coefficient obtained in the process 1 is quantized; and

Process 3: the transform coefficient quantized in the process 2 is subjected to variable-length coding.

The above-described quantization parameter qp indicates the magnitude of the quantization step QP used when the moving image coding device 2 quantizes the transform coefficient ($QP=2^{qp/6}$)

(Prediction Information PInfo)

As described above, as the prediction information PInfo, there are two types of inter-prediction information and intra-prediction information.

The inter-prediction information includes a coding parameter referred to when the moving image decoding device 1 generates an inter-predicted image through the inter-prediction. More specifically, the inter-prediction information includes inter-PU partition information for designating the partition pattern of the target CU into inter-PUs and an inter-prediction parameter of each inter-PU.

The inter-prediction parameter includes a reference image index, an estimation motion vector index, and a motion vector residual.

On the other hand, the intra-prediction information includes a coding parameter referred to when the moving image decoding device 1 generates an intra-predicted image through the intra-prediction. More specifically, the intra-prediction information includes intra-PU partition information for designating the partition pattern of the target CU into intra-PUs and an intra-prediction parameter of each intra-PU. The intra-prediction parameter is a parameter for restoring intra-prediction (prediction mode) of each intra-PU.

Parameters (intra-prediction parameters) related to the intra-prediction (DC prediction, planar prediction, and angular prediction) commonly used to code depth map DepthPic and a texture TexturePic include mpm_flag which is a flag related to most probable mode (MPM, the same applies below), mpm_idx which is an index for selecting the MPM, and rem_idx which is an index (residual prediction mode index) for designating the prediction mode other than the MPM. Here, the MPM is an estimation prediction mode which is highly likely to be selected in target partition. For example, the estimation prediction mode estimated based on the prediction mode allocated to peripheral partition of target partition, or a DC mode or the planar mode for which there is generally a high probability of occurrence can be included in the MPM. Hereinafter, in a case where a "prediction mode" is simply notated, the prediction mode indicates a luminance prediction mode. A chroma prediction mode is notated as a "chroma prediction mode" to distinguish the chroma prediction mode from the luminance prediction mode. A parameter for restoring the prediction mode includes chroma mode which is a parameter for designating the chroma prediction mode. Further, mpm_flag and rem_idx correspond to "prev_intra_luma_pred_flag" (SYN02 of FIG. 5(*a*)) and "rem_intra_luma_pred_mode" (SYN04 of FIG. 5(*b*)) in NPL 1. In addition, chroma mode corresponds to "intra_chroma_pred_mode" (not illustrated).

As parameters (a depth intra-prediction parameter and DMM prediction mode information) for restoring a prediction mode (an intra-extension mode (SYN01 of FIG. 5(*a*))) related to the depth intra-prediction (DMM prediction) used to code the depth map, there are a flag (depth intra-prediction presence or absence flag) dim_not_present_flag (SYN01A of FIG. 5(*b*)) indicating presence or absence of the depth intra-prediction, a flag (depth intra-mode flag) depth_intra_mode_flag (SYN01B of FIG. 5(*b*)) for selecting a depth intra-prediction method (DMM 1 prediction (INTRA_DMM_WFULL) based on wedgelet partition and DMM 4 prediction (INTRA_DMM_CREDTEX) based on contour partition), and an index (partition pattern index) wedge_full_tab_idx (SYN01C of FIG. 5(*b*)) for designating the partition pattern in the PU in the DMM 1 prediction.

As the prediction parameters for the depth intra-prediction, there is DC offset information for correcting depth prediction values of two regions partitioned in the PU, that is, a DC offset presence or absence flag depth_dc_flag (SYND1 of FIG. 6), depth_dc_abs (SYND02 of FIG. 6) indicating the absolute value of the DC offset value, and depth_do_sign_flag (SYND03 of FIG. 6) indicating the sign of the DC offset value.

[Moving Image Decoding Device]

Hereinafter, the configuration of the moving image decoding device 1 according to the embodiment will be described with reference to FIGS. 1 to 20.

(Overview of Moving Image Decoding Device)

The moving image decoding device 1 generates a predicted image for each PU, generates a decoded image #2 by adding the generated predicted image and prediction residual decoded from the coded data #1, and outputs the generated decoded image #2 to the outside.

Here, the predicted image is generated with reference to coding parameters obtained by decoding the coded data #1. The coding parameters are parameters which are referred to generate the predicted image. The coding parameters include the size or shape of the PU, the size or shape of a block, and residual data between an original image and the predicted image in addition to a prediction parameter such as a motion vector referred to in the inter prediction or a prediction mode referred to in the intra-prediction. Hereinafter, a set of all pieces of information among pieces of information included in the coded parameters excluding the residual data is referred to as side information.

Hereinafter, a picture (frame), a slice, a tree block, a CU, a block and a PU to be decoded are referred to as a target picture, a target slice, a target tree block, a target CU, a target block, and a target PU, respectively.

The size of the tree block is, for example, 64×64 pixels, the size of the CU is, for example, 64×64 pixels, 32×32 pixels, 16×16 pixels, or 8×8 pixels, and the size of the PU is, for example, 64×64 pixels, 32×32 pixels, 16×16 pixels, 8×8 pixels, or 4×4 pixels. These sizes are merely examples, and thus the sizes of the tree block the CU, and the PU may be sizes other than the above-mentioned sizes.

(Configuration of Moving Image Decoding Device)

Referring back to FIG. 3, a schematic configuration of the moving image decoding device 1 will be described below. FIG. 3 is a functional block diagram illustrating the schematic configuration of the moving image decoding device 1.

As illustrated in FIG. 3, the moving image decoding device 1 includes a variable-length decoding section 11, an inverse quantization and inverse transform section 13, a predicted image generation section 14, an addition section 15, and a frame memory 16.

[Variable-Length Decoding Section]

The variable-length decoding section 11 decodes various parameters included in the coded data #1 input from the moving image decoding device 1. In the following description, the variable-length decoding section 11 is assumed to appropriately decode the parameters decoded by an entropy coding method such as CABAC. Specifically, the variable-length decoding section 11 decodes the coded data #1 equivalent to one frame in the following procedure.

First, the variable-length decoding section 11 demultiplexes the coded data #1 equivalent to one frame to separate the coded data #1 into various pieces of information included in the hierarchical structure illustrated in FIG. 4. For example, the variable-length decoding section 11 sequentially separates the coded data #1 into the slices and the tree blocks with reference to information included in various headers.

Here, various headers include (1) information regarding a method of partitioning a target picture into slices and (2) information regarding the size and shape of a tree block belonging to a target slice and the position of the tree block in the target slice.

The variable-length decoding section 11 partitions the target tree block into the CUs with reference to the tree block partition information SP_TBLK included in the tree block header TBLKH. The variable-length decoding section 11 decodes the TT information TTI regarding the transform tree obtained in regard to the target CU and the PT information PTI regarding the prediction tree obtained in regard to the target CU.

The variable-length decoding section 11 supplies the TT information TTI obtained in regard to the target CU to the TU information decoding section 12. The variable-length decoding section 11 supplies the TP information PTI obtained in regard to the target CU to the predicted image generation section 14. The TT information TTI includes the TU information TUI corresponding to the TU included in the transform tree, as described above. The PT information PTI includes the PU information PUI (the prediction information Pinfo of each PU) corresponding to each PU included in the target prediction tree, as described above.

Hereinafter, a schematic process of decoding the intra-prediction parameters included in the prediction information Pinfo of the deep intra PU according to the invention will be described.

The variable-length decoding section 11 decodes each syntax from the coded data #1 according to a syntax table of an intra-prediction mode extension intra_mode_ext( ) shown in SYN01 of FIG. 5. The intra-prediction mode extension intra_mode_ext( ) is decoded in a decoding target layer in a case where a flag (depth mode enabled flag) vps_depth_modes_flag indicating suitability of a depth coding tool is 1. In a case where the depth mode enable flag is 1, it is indicated that the depth coding tool is applied in the decoding target layer. In a case where the depth mode enable flag is 0, it is indicated that the depth coding tool is not applied. The depth mode enabled flag is decoded from parameter sets (the video parameter set VPS, the sequence parameter set SPS, the picture parameter set PPS, and the slice header SH) or the like.

First, the variable-length decoding section 11 decodes the depth intra-prediction presence or absence flag dim_not_present_flag in a case where a target PU size is equal to or less than 32×32 (where log PbSize<6). In a case where the target PU size is greater than 32×32, the value of the flag is estimated to be 1. In a case where the flag is a flag indicating presence or absence of the depth intra-prediction and the value of the flag is 1, it is indicated that the depth intra-prediction mode flag depth_intra_mode_flag related to the target PU is not present in the coded data and the intra-prediction method of one of intra-prediction mode numbers '0' to '34' (the DC prediction, the planar prediction, and the angular prediction) is used for the target PU. In a case where the flag is 0, it is indicated that the depth intra-prediction mode depth_intra_mode_flag is present in the coded data.

The variable-length decoding section 11 derives the DMM flag DmmFlag by the following formula based on the decoded depth intra-prediction presence or absence flag dim_not_present_flag.

$$DmmFlag=!dim\_not\_present\_flag.$$

That is, the value of logical NOT of the depth intra-prediction presence or absence flag is set in the DMM flag. In a case where the DMM flag is 1, it is indicated that the depth intra-prediction is used. In a case where the DMM flag is 0, it is indicated that the depth intra-prediction is not used.
(Case where Depth Intra-Prediction Presence or Absence Flag is 1)

In a case where the depth intra-prediction presence or absence flag dim_not_present_flag is 1, the variable-length decoding section 11 further decodes a depth intra-mode flag depth_intra_mode_flag. The flag is a flag regarding selection of the depth intra-prediction method. In a case where the flag is 0, it is indicated that the depth intra-prediction is the DMM 1 prediction. In a case where the flag is 1, it is indicated that the depth intra-prediction is the DMM 4 prediction.

The variable-length decoding section 11 sets a prediction mode number indicating the DMM 1 prediction in the prediction mode predModeIntra in a case where the depth intra-mode flag depth_intra_mode_flag is 0, that is, a case where the depth intra-prediction is the DMM 1 prediction. Further, the partition pattern index wedge_full_tab_idx for designating the partition pattern in the PU is decoded.

The variable-length decoding section 11 sets a prediction mode number indicating the DMM 4 prediction in the prediction mode predModeIntra in a case where the depth intra-mode flag depth_intra_mode_flag is 1, that is, a case where the depth intra-prediction is the DMM 4 prediction.
(Case where Depth Intra-Prediction Presence or Absence Flag is 0)

The variable-length decoding section 11 decodes the MPM flag mpm_flag indicating whether the intra-prediction mode of the target PU is identical to the estimation prediction mode MPM in a case where the depth intra-prediction presence or absence flag dim_not_present_flag is 0. In a case where the flag is 1, it is indicated that the intra-prediction mode of the target PU is identical to the estimation prediction mode MPM. In a case where the flag is 0, the intra-prediction mode indicates one prediction mode among the prediction mode numbers '0' to '34' (one of the DC prediction, the planar prediction, and the angular prediction) excluding the estimation prediction mode MPM.

In a case where the MPM flag is 1, the variable-length decoding section 11 decodes the MPM index mpm_idx designating the estimation prediction mode MPM and sets the estimation prediction mode indicated by mpm_idx in the prediction mode predModeIntra.

In a case where the MPM flag is 0, the variable-length decoding section 11 further decodes the index rem_idx for designating the prediction mode other than the MPM and sets one prediction mode number in the prediction mode predModeIntra among the prediction mode numbers '0' to '34' (one of the DC prediction, the planar prediction, and the angular prediction) specified from rem_idx, excluding the estimation prediction mode MPM.

In a case where the DMM flag DmmFlag is 1, the variable-length decoding section 11 decodes the DC offset information for correcting depth prediction values of two regions i (where i=0 and 1) partitioned in the PU in the depth intra-prediction. More specifically, the DC offset presence or absence flag depth_dc_flag indicating presence or absence of the DC offset information is first decoded in the target intra-CU. In a case where the flag is 1, it is indicated that the DC offset information is present in the coded data. In a case where the flag is 0, it is indicated that the DC offset information is not present in the coded data.

In a case where the DC offset presence or absence flag depth_dc_flag is 1, the variable-length decoding section 11 further decodes depth_dc_abs[i] indicating the absolute value (DC offset absolute value) of the DC offset value.

Subsequently, in a case where the DC offset absolute value depth_dc_abs[i] is greater than 0, the variable-length decoding section 11 further decodes depth_dc_sign_flag[i] indicating the positive or negative sign of the DC offset value.

The variable-length decoding section 11 derives DC offset values DcOffset[i] corresponding to the two regions i (where i=0 and 1) partitioned in each PU from the DC offset information (the DC offset absolute value depth_dc_abs[i] and a DC offset sign depth_dc_sign_flag[i]).

$$DcOffset[i]=(1-2*depth\_dc\_sign\_flag[i])*depth\_dc\_abs[i].$$

[Inverse Quantization and Inverse Transform Section]

The inverse quantization and inverse transform section 13 executes an inverse quantization and inverse transform process on each block included in the target CU based on the TT information TTI. Specifically, the inverse quantization and inverse transform section 13 restores a prediction residual D of each pixel by executing inverse quantization and inverse orthogonal transform of a quantization prediction residual included in the TU information TUI corresponding to the target TU on each target TU. Here, orthogonal transform refers to orthogonal transform from a pixel region to a frequency domain. Accordingly, inverse orthogonal transform is transform from a frequency domain to a pixel region. Examples of the inverse orthogonal transform include inverse discrete cosine transform (DCT) and inverse discrete sine transform (DST). The inverse quantization and inverse transform section 13 supplies the restored prediction residual D to the addition section 15.

[Predicted Image Generation Section]

The predicted image generation section 14 generates a predicted image in regard to each PU included in the target CU based on the PT information PTI. Specifically, the predicted image generation section 14 generates a predicted image Pred from a local decoded image P' which is an image after decoding by executing intra-prediction or inter-prediction on each target PU according to the parameters included in the PU information PUI (prediction information Pinfo) corresponding to the target PU. The predicted image generation section 14 supplies the generated predicted image Pred to the addition section 15. The configuration of the predicted image generation section 14 will be described in more detail later.

[Addition Section]

The addition section 15 generates a decoded image P in regard to the target CU by adding the predicted image Pred supplied from the predicted image generation section 14 and the prediction residual D supplied from the inverse quantization and inverse transform section 13.

[Frame Memory]

The decoded images P are sequentially recorded on the frame memory 16. The decoded images corresponding to all of the tree blocks (for example, all of the tree blocks previous in a raster scan procedure) decoded earlier than the target tree block are recorded at a time point at which the target tree block is decoded on the frame memory 16.

At a time point at which the target CU is decoded, the decoded images corresponding to all of the CUs decoded earlier than the target CU are recorded.

At a time point at which the decoded image generation process in the tree block unit ends in regard to all of the tree blocks in the image in the moving image decoding device 1, the decoded image #2 corresponding to the coded data #1 input to the moving image decoding device 1 and corresponding to an one input frame is output to the outside.

(Definition of Prediction Mode)

As described above, the predicted image generation section 14 generates a predicted image based on the PT information PTI and outputs the predicted image. In a case where the target CU is an intra-CU, the PU information PTI input to the predicted image generation section 14 includes a prediction mode (IntraPredMode) and a chroma prediction mode (IntraPredModeC). Hereinafter, definition of the prediction modes (luminance and chroma) will be described with reference to FIGS. 7, 8, and 9.

(Overview)

FIG. 7 illustrates examples of classification of intra-prediction modes used in the moving image decoding device 1 and corresponding prediction mode numbers. A prediction mode number '0' is allocated to the planar prediction (INTRA_PLANAR), a prediction mode number '1' is allocated to the DC prediction (INTRA_DC), prediction mode numbers '2' to '34' are allocated to the angular prediction (INTRA_ANGULAR), a predicting mode number '35' is allocated to the DMM 1 prediction (INTRA_DMM_W-FULL), and a prediction mode number '36' is allocated to the DMM 4 prediction (INTRA_DMM_CREDTEX). The angular prediction of a prediction mode number 'X' (where X=2 to 34) is also referred to as INTRA_ANGULARX. In the angular prediction, a prediction method to which the prediction mode number '10' is allocated is referred to as horizontal prediction and a prediction method to which the prediction mode number '26' is allocated is referred to as vertical prediction. The horizontal prediction, the vertical prediction, and the angular prediction are collectively referred to as directional prediction. The directional prediction is a prediction method of generating a predicted image by extrapolating an adjacent pixel value around the target PU in a specific direction. The DMM 1 prediction and the DMM 4 prediction are collectively referred to as depth intra-prediction. The depth intra-prediction is basically based on a depth model in which a target block (also referred to as a depth block) on a depth map is configured to include two nonrectangular flat regions and a depth value of each flat region is expressed as a fixed value. The depth model is configured to include partition information indicating a region to which each pixel belongs and depth value information regarding each region. In the DMM prediction, there are two types of different partition types, that is, wedgelet partition and contour partition as the depth block partition methods. The details of the depth intra-prediction will be described later.

Figure 8:
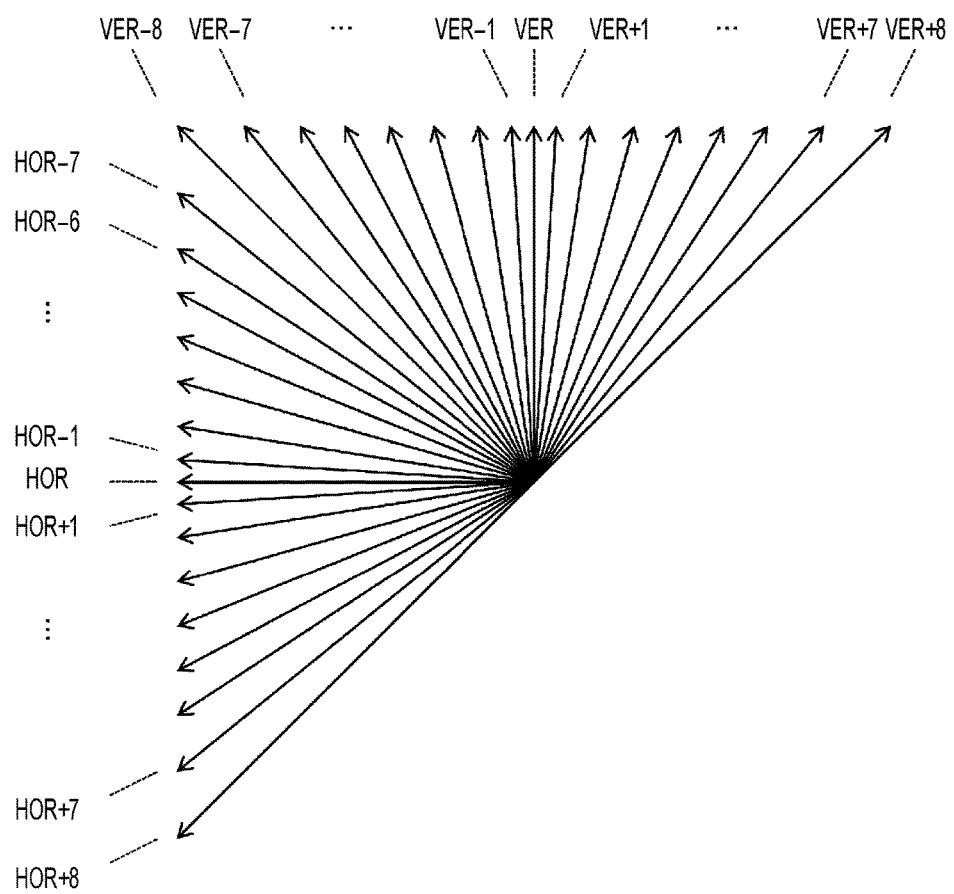
FIG. 8 is a diagram illustrating a prediction direction corresponding to an identifier of a prediction mode in 33 types of prediction modes belonging to directional prediction.

Next, an identifier of each prediction mode included in the directional prediction will be described with reference to FIG. 8. FIG. 8 illustrates the identifiers of the prediction modes and corresponding prediction directions in 33 types of prediction modes belonging to the directional prediction. The directions of arrows in FIG. 8 indicate prediction directions. More precisely, the directions of arrows indicate the directions of vectors from a prediction target pixel to decoded pixels which are referred to by the prediction target pixel. In that sense, the prediction direction is also referred to a reference direction. For the identifier of each prediction mode, a sign indicating whether a main direction is a horizontal direction (HOR) or a vertical direction (VER) is associated with an identifier formed from a combination of displacements in the main direction. For example, a sign HOR is allocated to the horizontal prediction, a sign VER is allocated to the vertical prediction, a sign VER+8 is allocated to a prediction mode in which a peripheral pixel in the top right 45° direction is referred to, a sign VER−8 is allocated to a prediction mode in which a peripheral pixel in the top left 45° direction is referred to, and a sign HOR+8 is allocated to a prediction mode in which a peripheral pixel in the bottom left 45° direction is referred to. In the directional prediction, prediction modes in which 17 main directions of VER−8 to VER+8 are prediction modes in the vertical direction and prediction modes in which 16 main directions of HOR−7 to HOR+8 are the horizontal prediction are defined.

The association of the prediction mode numbers and the intra-prediction methods applied to the moving image decoding device 1 may be defined, for example, as illustrated in FIG. 9. FIG. 9 is a diagram illustrating an example of prediction mode definition DEFPM1 which is definition of the association of the intra-prediction methods and the prediction mode numbers. In the prediction mode definition DEFPM1 illustrated in FIG. 9, the prediction mode number '0' is allocated to the planar prediction and the prediction mode number '1' is allocated to the DC prediction. The angular prediction modes VER−8 to VER+8 in which the main direction is the vertical prediction are allocated to the prediction mode numbers '2' to '18' and the angular prediction modes HOR−7 to HOR+8 in which the main direction is the horizontal prediction are allocated to the prediction mode numbers '19' to '34'.

(Details of Predicted Image Generation Section)

Figure 11:
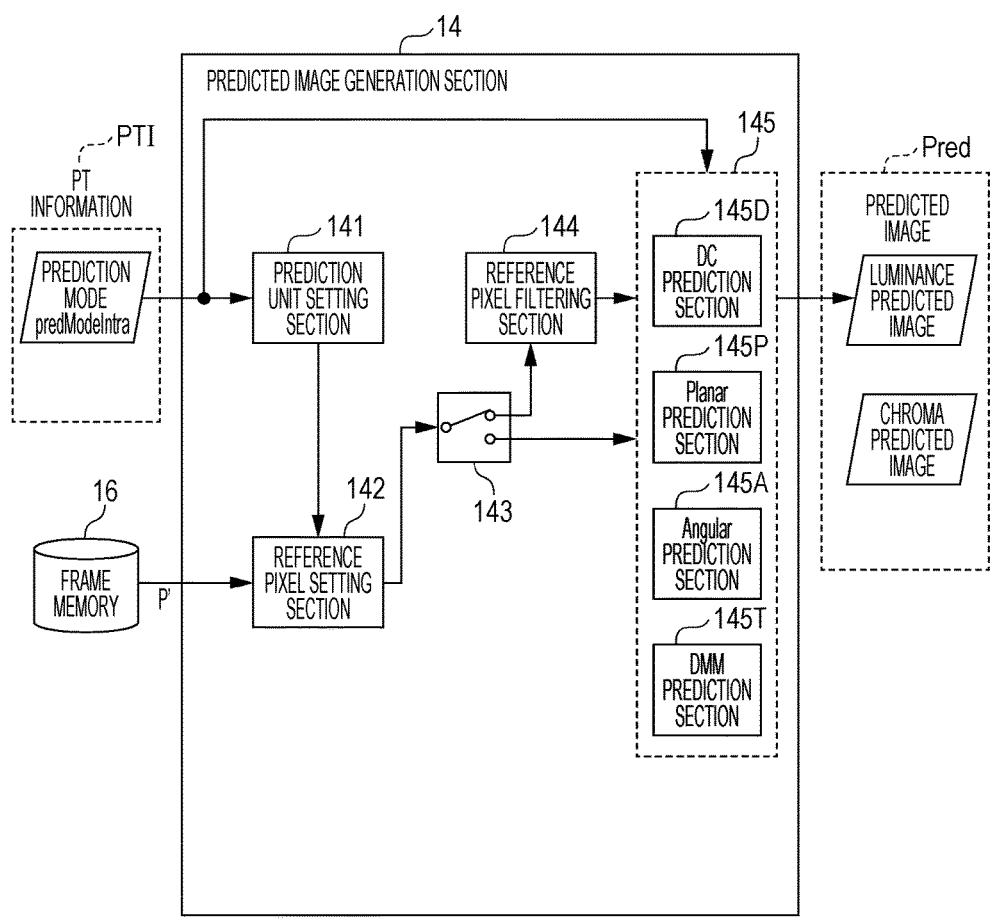
FIG. 11 is a functional block diagram illustrating an example of the configuration of a predicted image generation section included in the moving image decoding device.

Next, the configuration of the predicted image generation section 14 will be described in more detail with reference to FIG. 11. FIG. 11 is a functional block diagram illustrating an example of the configuration of the predicted image generation section 14. In the example of the configuration, a functional block related to generation of a predicted image of the intra-CU in the functions of the predicted image generation section 14 is illustrated.

As illustrated in FIG. 11, the predicted image generation section 14 includes a prediction unit setting section 141, a reference pixel setting section 142, a switch 143, a reference pixel filtering section 144, and a predicted image derivation section 145.

The prediction unit setting section 141 sets target PUs in a setting procedure of the definition of the PUs included in the target CU and outputs information (target PU information) regarding the target PU. The target PU information includes at least a size nS of the target PU, the position of the target PU in the CU, and an index (luminance or chroma index cIdx) indicating a luminance or chroma plane of the target PU.

As the setting procedure of the PUs, for example, in a case where an input image has a YUV format, a procedure is used in which the PUs corresponding to Y included in the target CU are set in a raster scan procedure and the PUs corresponding in the procedure of U and V are subsequently set in the raster scan procedure.

The setting procedure of the PUs in a case where an input image is a viewpoint image TexturePic expressed with a YUV format of 4:2:0 and the PUs included in the CU will be described with reference to illustrated FIG. 12.

FIG. 12(A) illustrates the PUs in the CU in a case where the size of the target CU is 8×8 pixels and a partition type is N×N. First, four PUs of 4×4 pixels corresponding to luminance Y are set in the raster scan procedure (a procedure of PU_Y0, PU_Y1, PU_Y2, and PU_Y3). Next, one PU (PU_U0) of 4×4 pixels corresponding to chroma U is set. Finally, one prediction unit (PU_V0) of 4×4 pixels corresponding to chroma V is set.

FIG. 12(B) illustrates the PUs in the CU in a case where the size of the target CU is 16×16 pixels and a partition type is 2N×2N. First, one prediction unit (PU_Y0) of 16×16 pixels corresponding to luminance Y is set. Next, one prediction unit (PU_U0) of 8×8 pixels corresponding to chroma U is set. Finally, one prediction unit (PU_V0) of 8×8 pixels corresponding to chroma V is set.

Next, the setting procedure of the PUs in a case where an input image is a depth map DepthPic expressed with a YUV format of 4:0:0 and the PUs included in the CU will be described with reference to illustrated FIG. 13.

FIG. 13(A) illustrates the PUs in the CU in a case where the size of the target CU is 8×8 pixels and a partition type is N×N. First, four PUs of 4×4 pixels corresponding to luminance Y are set in the raster scan procedure (a procedure of PU_Y0, PU_Y1, PU_Y2, and PU_Y3).

FIG. 13(B) illustrates the PUs in the CU in a case where the size of the target CU is 16×16 pixels and a partition type is 2N×2N. First, one prediction unit (PU_Y0) of 16×16 pixels corresponding to luminance Y is set.

The reference pixel setting section 142 reads a pixel value (decoded pixel value) of a decoded image around the target PU recorded on the frame memory based on the input target PU information and sets a reference pixel referred to at the time of generation of a predicted image. A reference pixel value $p[x][y]$ is set using a decoded pixel value $r[x][y]$ by the following formula.

$$p[x][y]=r[xB+x][yB+y]\ x=-1, y=-1 \text{ to } (nS*2-1) \text{ and } x=0 \text{ to } (nS*2-1), y=-1$$

Here, (xB, yB) indicates the position of a top left pixel in the target PU, and nS indicates the size of the target PU and indicates a larger value between the width and the height of the target PU. In the foregoing formula, basically, decoded pixel values included in the lines of decoded pixels adjacent to the top side of the target PU and columns of the decoded pixels adjacent to the left side of the target PU are copied to corresponding reference pixel values. In a case where the decoded pixel values corresponding to specific reference pixel positions are not present or not referred to, pre-decided values, for example, 1<<(BitDepth−1), may be used. Here, BitDepth is bit depth of a pixel. Instead of the pre-decided values, referable decoded pixel values present near a corresponding decoded pixel value may be used.

The switch 143 outputs a reference pixel to a corresponding output destination based on the luminance or chroma index cIdx and the prediction mode predModeIntra among the pieces of input target PU information. More specifically, on the assumption that the luminance or chroma index cIdx is 0 (a processing target pixel is luminance) and the prediction mode predModeIntra is 0 to 34 (the prediction mode is the planar prediction, the DC prediction, or the angular prediction (predModeIntra<<35)), the switch 143 outputs the input reference pixel to the reference pixel filtering section 144. In other cases, that is, on the assumption that the luminance or chroma index cIdx is 1 (a processing target pixel is chroma) or the prediction mode predModeIntra is the depth intra-prediction (the DMM 1 prediction or the DMM 4 prediction) allocated to the prediction mode numbers '35' and '36' (predModeIntra>=35), the switch 143 outputs the input reference pixel to the predicted image derivation section 145.

The reference pixel filtering section 144 applies a filter to the input reference pixel value and outputs the reference pixel value after the application of the filter. Specifically, the reference pixel filtering section 144 decides whether to apply a filter according to the target PU size and the prediction mode predModeIntra.

The predicted image derivation section 145 generates a predicted image predSamples in the target PU based on the input PU information (the prediction mode predModeIntra, the luminance or chroma index cIdx, and the PU size nS) and the reference pixel p[x][y] and outputs the predicted image predSamples. The details of the predicted image derivation section 145 will be described later.

(Flow of Predicted Image Generation Process)

Figure 14:
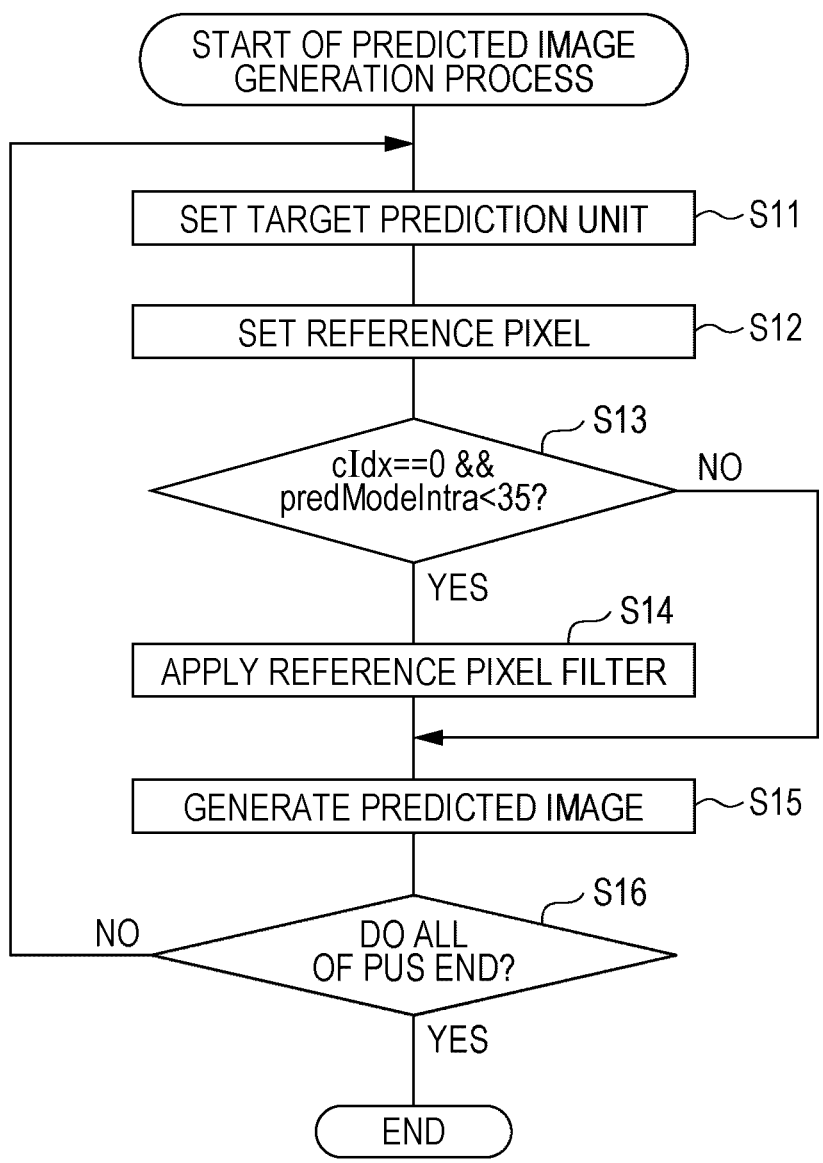
FIG. 14 is a flowchart illustrating a schematic predicted image generation process in a CU unit in the predicted image generation section.

Next, a schematic predicted image generation process in the CU unit in the predicted image generation section 14 will be described with reference to the flowchart of FIG. 14. When the predicted image generation process in the CU unit starts, the prediction unit setting section 141 first sets one PU included in the CU as a target PU in the pre-decided procedure and outputs the target PU information to the reference pixel setting section 142 and the switch 143 (S11). Next, the reference pixel setting section 142 sets a reference pixel of the target PU using a decoded pixel value read from an external frame memory (S12). Next, the switch 143 determines whether the target PU is luminance or chroma or the prediction mode predModeIntra is the DMM prediction based on the input target PU information and switches an output according to the determination result (S13).

In a case where the target PU is luminance and the prediction mode predModeIntra is not the depth intra-prediction (cIdx==0&& predModeIntra<35) (YES in S13), the output of the switch 143 is connected to the reference pixel filtering section 144. Subsequently, the reference pixel is input to the reference pixel filtering section 144, a reference pixel filter is applied according to a separately input prediction mode, and the reference pixel after the application of the filter is output to the predicted image derivation section 145 (S14).

Conversely, in a case where the target PU is the chroma or the prediction mode predModeIntra is the depth intra-prediction (cIdx==1||predModeIntra>=35) (NO in S13), the output of the switch 143 is connected to the predicted image derivation section 145.

Next, the predicted image derivation section 145 generates the predicted image predSamples in the target PU based on the input PU information (the prediction mode predModeIntra, the luminance or chroma index cIdx, and the PU size nS) and the reference pixel p[x][y] and outputs the predicted image predSamples (S15).

When the generation of the predicted image of the luminance or the chroma of the target PU ends, the prediction unit setting section 141 determines whether the predicted image of all of the PUs in the target CU is generated (S16). In a case where the predicted image of some of the PUs in the target CU is not generated (NO in S16), the process returns to the foregoing S1 and the predicted image generation process of a subsequent PU in the target CU is executed. In a case where the predicted image of all of the PUs in the target CU is generated (YES in S16), the predicted image of the luminance and the chroma of each PU in the target CU is accordingly output as the predicted image of the target CU and the process ends.

(Details of Predicted Image Derivation Section 145)

Next, the details of the predicted image derivation section 145 will be described. As illustrated in FIG. 11, the predicted image derivation section 145 further includes a DC prediction section 145D, a planar prediction section 145P, an angular prediction section 145A, and a DMM prediction section 145T.

The predicted image derivation section 145 selects a prediction method to be used to generate a predicted image based on the input prediction mode predModeIntra. The selection of the prediction method is realized by selecting a prediction method corresponding to the prediction mode number of the input prediction mode predModeIntra based on the above-described definition of FIG. 7.

Further, the predicted image derivation section 145 derives the predicted image according to the selection result of the prediction method. More specifically, in a case where the prediction method is the planar prediction, the DC prediction, the angular prediction, and the DMM prediction, the planar prediction section 145P, the DC prediction section 145D, the angular prediction section 145A, and the DMM prediction section 145T of the predicted image derivation section 145 derive the predicted image, respectively.

The DC prediction section 145D derives a DC prediction value equivalent to an average value of the pixel values of the input reference pixels and outputs the predicted image in which the derived DC prediction value is set as a pixel value.

The planar prediction section 145P generates the predicted image in accordance with the derived pixel value by linearly adding the plurality of reference pixels according to a distance from the prediction target pixel and outputs the predicted image. For example, the pixel value predSamples [x][y] of the predicted image can be derived using the reference pixel value p[x][y] and the size nS of the target PU by the following formula.

$$\text{predSamples}[x][y]=(((nS-1-x)p[-1][y]+(x+1)*\\p[nS][-1]+(nS-1-y)*p[x][-1]+(y+1)*p[-1][nS]+\\nS)>>(k+1).$$

Here, x and y=0 to nS−1 and k=log 2(nS) is defined.

[Angular Prediction Section 145A]

The angular prediction section 145A generates the predicted image corresponding to the target PU using the reference pixel in the prediction direction (reference direction) corresponding to the input prediction mode predModeIntra and outputs the predicted image. In the process of generating the predicted image through the angular prediction, a main reference pixel is set according to a value of the prediction mode predModeIntra and the predicted image is generated with reference to the main reference pixel in units of lines or columns in the PU.

The angular prediction section 145A derives the prediction direction (the reference direction) associated with the input prediction mode predModeIntra. The derived prediction direction is expressed as a combination of a main direction flag bRefVer indicating whether the main direction is the vertical direction and a gradient (offset) intraPredAngle in the main direction of the prediction direction. In a case where a value of the main direction flag bRefVer is 0, the main direction indicates the horizontal direction. In a case where a value of the main direction flag bRefVer is 1, the main direction indicates the vertical direction.

The angular prediction section 145A derives the main direction flag bRefVer further based on a value of the prediction mode predModeIntra. In a case where the prediction mode predModeIntra is a number less than the prediction mode number '18' (predModeIntra<18), the main direction is determined to be horizontal and the main direction flag bRefVer is set to 0. In other cases (predModeIntra>=18), the main direction is determined to be vertical and the main direction flag bRefVer is set to 1.

Further, the angular prediction section 145A derives a gradient intraPredAngle corresponding to the prediction mode predModeIntra with reference to a gradient definition table DEFANG1 illustrated in FIG. 10. Here, the gradient definition table DEFALG1 illustrated in FIG. 10 is a table that indicates a correspondence relation between the prediction mode number and a value of the gradient intraPredAngle. The value of the gradient intraPredAngle is a value indicating a gradient of the prediction direction. More precisely, in a case where the main direction is the vertical direction, the direction of a vector expressed as (intraPredAngle, −32) is the prediction direction. In a case where the main direction is the horizontal direction, the direction of a vector expressed as (−32, intraPredAngle) is the prediction direction.

(In Case where Main Direction is Vertical)

When the main direction flag bRefVer is 1 (the main direction is vertical; predModeIntra>=18), the angular prediction section 145A sets a generation unit of the predicted image to a line and sets a reference pixel on the upper side of the target PU as a main reference pixel. Specifically, a main reference pixel ref[x] is set using a value of the reference pixel p[x][y] in the following procedure.

(1) The reference pixel p[x][y] adjacent to the upper side of the target PU is set to a main reference pixel ref[x][y] up to a range of x=0 to nS using x as a variable by the following formula.

$$ref[x]=p[-1+x][-1], \text{ with } x=0 \text{ to } nS.$$

(2) In a case where the gradient intraPredAngle corresponding to the prediction mode predModeIntra is less than 0, the reference pixel p[x][y] adjacent to the left side of the target PU is set to the main reference pixel ref[x][y] up to a range of x=−1 to (nS*intraPredAngle)>>5 using x as a variable by the following formula.

$$ref[x]=p[-1][-1+((x*invAngle+128)>>8)], \text{ with } x=-1 \text{ to } (nS*intraPredAlgnle)>>5.$$

In other cases (intraPredAngle>=0), the reference pixel p[x][y] adjacent to the upper side of the target PU is set to the main reference pixel ref[x][y] up to a range of x=nS+1 to 2*nS using x as a variable by the following formula.

$$ref[x]=p[-1+x][-1], \text{ with } x=nS+1 \text{ to } 2*nS.$$

Here, invAngle is equivalent to a value obtained by scaling a reciprocal of a displacement intraPredAngle (multiplying 8192) in the prediction direction.

The angular prediction section 145A derives a position iIdx of integer precision in a pixel unit and a position iFact of decimal point precision in the pixel unit by the following formulae, which are the position of the main reference pixel used to generate the prediction target pixel calculated according to a prediction target line, a distance (y+1) of the main reference pixel, and the gradient intraPredAngle.

$$iIdx=((y+1)*intraPredAngle)>>5; \text{ and}$$

$$iFact=((y+1)*intraPredAngle)\&31.$$

Here, '&' is an operator indicating a bit operation of a logical product and a result of "A & 31" means a remainder when an integer A is divided by 32. The same applies below.

The angular prediction section 145A derives the predicted image predSamples[x][y] of the target PU by the following formula according to the derived variable iFact.

In a case where the variable iFact is 0 (where iFact==0), the predicted image predSamples[x][y] is derived through linear interpolation.

$$predSamples[x][y]=((32-iFact)*ref[x+iIdx+1]+iFact*ref[x+iIdx+2]+16)>>5.$$

In other cases (iFact!=0), the main reference pixel ref[x+iIdx+1] is set to the predicted image predSamples[x][y].

$$predSamples[x][y]=ref[x+iIdx+1].$$

(In Case where Main Direction is Horizontal)

In a case where the value of the main direction flag bRefVer is 0 (the main direction is the horizontal direction; predModeIntra <18), a generation unit of the predicted image is set to a column and a reference pixel on the left side of the target PU is set as a main reference pixel. Specifically, the main reference pixel ref[x] is set using a value of the reference pixel p[x][y] in the following procedure.

(1) The reference pixel p[x][y] adjacent to the left side of the target PU is set to the main reference pixel ref[x][y] up to a range of x=0 to nS using x as a variable by the following formula.

$$ref[x]=p[-1][-1+x], \text{ with } x=0 \text{ to } nS.$$

(2) In a case where the gradient intraPredAngle corresponding to the prediction mode predModeIntra is less than 0, the reference pixel p[x][y] adjacent to the upper side of the target PU is set to the main reference pixel ref[x][y] up to a range of x=−1 to (nS*intraPredAngle)>>5 using x as a variable by the following formula.

$$ref[x]=p[-1+((x*invAngle+128)>>8)][-1], \text{ with } x=-1 \text{ to } (nS*intraPredAlgnle)>>5.$$

In other cases (intraPredAngle>=0), the reference pixel p[x][y] adjacent to the left side of the target PU is set to the main reference pixel ref[x][y] up to a range of x=nS+1 to 2*nS using x as a variable by the following formula.

$$ref[x]=p[-1][-1+x], \text{ with } x=nS+1 \text{ to } 2*nS.$$

The angular prediction section 145A derives a position iIdx of integer precision in a pixel unit and a position iFact of decimal point precision in the pixel unit by the following formulae, which are the position of the main reference pixel used to generate the prediction target pixel calculated according to a prediction target column, a distance (x+1) of the main reference pixel, and the gradient intraPredAngle.

$$iIdx=((x+1)*intraPredAngle)>>5; \text{ and}$$

$$iFact=((x+1)*intraPredAngle)\&31.$$

The angular prediction section 145A derives the predicted image predSamples[x][y] of the target PU by the following formula according to the derived variable iFact.

In a case where the variable iFact is 0 (where iFact=0), the predicted image predSamples[x][y] is derived through linear interpolation.

predSamples[x][y]=((32−iFact)*ref[x+iIdx+1]+
    iFact*ref[x+iIdx+2]+16)>>5.

In other cases (iFact!=0), the main reference pixel ref[x+iIdx+1] is set to the predicted image predSamples[x][y].

predSamples[x][y]=ref[x+iIdx+1].

[DMM Prediction Section 145T]

The DMM prediction section 145T generates a predicted image corresponding in the target PU based on the DMM prediction (Depth Modeling Mode which is also referred to as depth intra-prediction) corresponding to the input prediction mode predModeIntra and outputs the predicted image.

Figure 15:
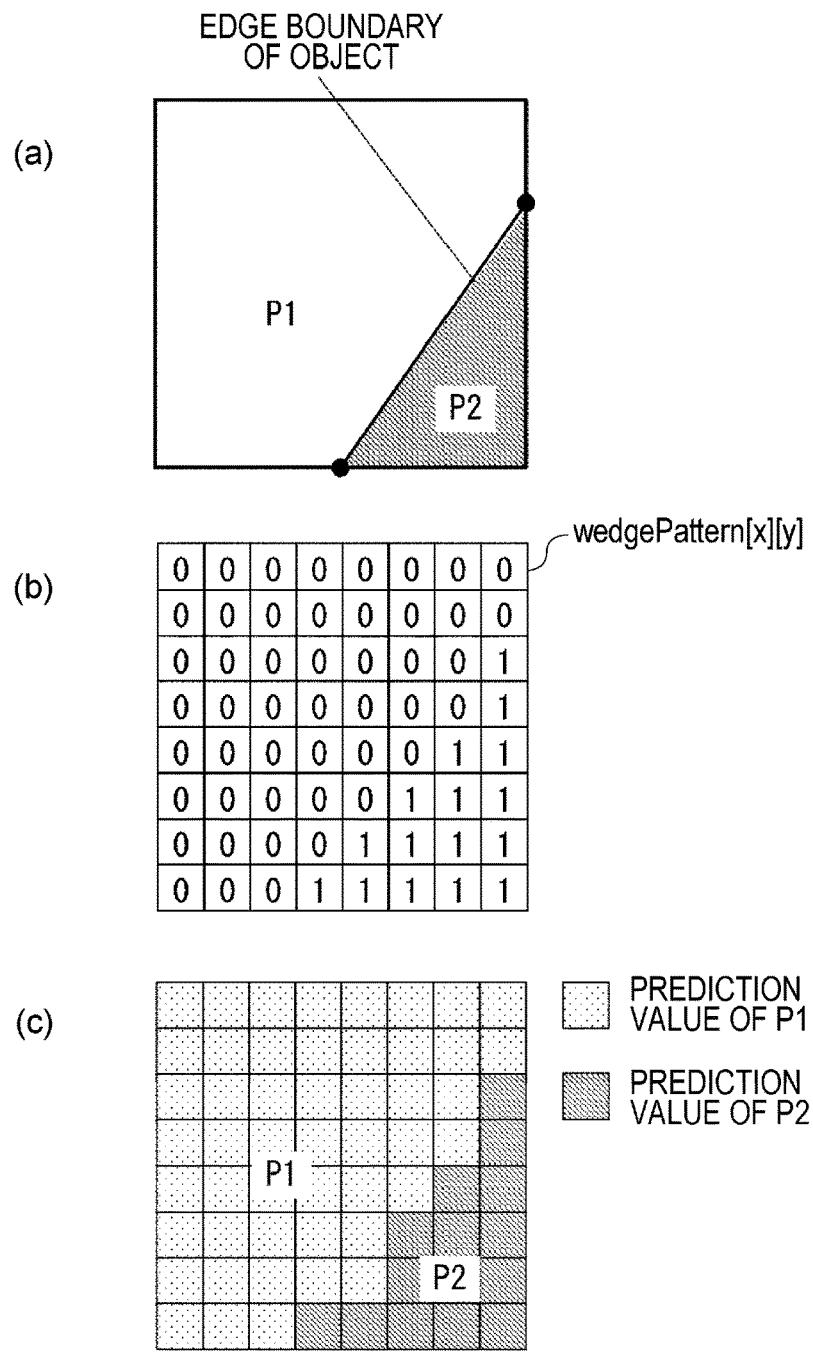
FIG. 15 is a diagram illustrating schematic DMM prediction.

A schematic DMM prediction will be described with reference to FIG. 15 before detailed description of the DMM prediction section 145T. FIG. 15 is a conceptual diagram illustrating the DMM prediction executed by the DMM prediction section 145T. As illustrated in FIG. 15(a), a depth map mainly is characterized in that the depth map has an edge region indicating an object boundary and a flat region (a depth value is substantially constant) indicating an object area. First, in the DMM prediction, basically, a target block is partitioned into two regions P1 and P2 along an edge of an object using the image characteristics of the depth map and a partition pattern (wedgelet pattern) WedgePattern[x][y] which is pattern information indicating a region to each pixel belongs is derived, as illustrated in FIG. 15(b).

The partition pattern WedgePattern[x][y] is a matrix which has a size of width×height of a target block (target PU) and in which 0 or 1 is set for each component (x, y) and indicates that each pixel of the target block belongs one of the two regions P1 and P2. In the example of FIG. 15(b), when the value of a component is 0, the pixel belongs to the region P1. When the value of a component is 1, the pixel belongs to the region P2. Next, as illustrated in FIG. 15(c), a predicted image is generated by filling the regions P1 and P2 with depth prediction values.

Figure 1:
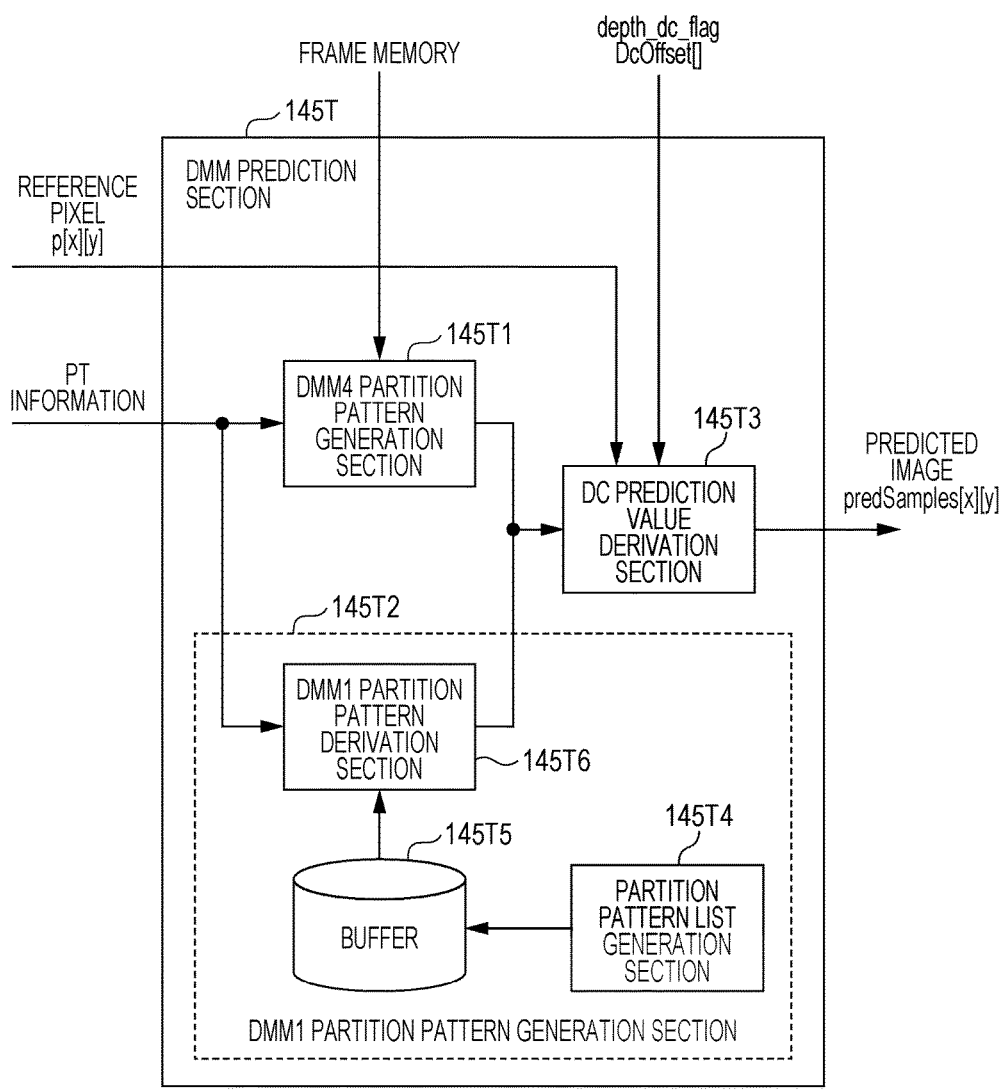
FIG. 1 is a block diagram illustrating the detailed configuration of a DMM prediction section according to an embodiment.

Hereinafter, the configuration of the DMM prediction section 145T will be described with reference to FIG. 1. FIG. 1 is a functional block diagram illustrating an example of the configuration of the DMM prediction section 145T.

As illustrated in FIG. 1, a DMM 4 partition pattern generation section 145T1, a DMM 1 partition pattern generation section 145T2, and a DC prediction value derivation section 145T3 are included.

The DMM prediction section 145T activates partition pattern derivation means (a DMM 1 partition pattern derivation section or a DMM 4 partition pattern derivation section) corresponding to the input prediction mode predModeIntra to generate a partition pattern wedgePattern[x][y] of the target PU. More specifically, in a case where the prediction mode predModeIntra is the prediction mode number '35', that is, the INTRA_DMM_WEDGEFULL mode, a DMM 1 partition pattern derivation section 145T6 is activated. On the other hand, in a case where the prediction mode predModeIntra is the prediction mode number '36', that is, the INTRA_DMM_CPCREDTEX mode, a DMM 4 partition pattern derivation section 145T3 is activated.

[DMM 4 Partition Pattern Generation Section 145T1]

The DMM 4 partition pattern generation section 145T1 derives the partition pattern wedgePattern[x][y] of the target PU based on a decoded pixel value recTexPic of luminance on the viewpoint image TexturePic corresponding to the target PU on the depth map DepthPic and outputs the partition pattern wedgePattern[x][y] to the DC prediction value derivation section 145T3. Generally, the DMM 4 partition pattern generation section 145T1 derives partition pattern by binarizing a target block of the two regions P1 and P2 of the target PU on the depth map in accordance with an average value of the luminance of the target block on the corresponding viewpoint image TexturePic.

First, the DMM 4 partition pattern generation section 145T1 reads a luminance decoded pixel value recTextPic of a corresponding block on the viewpoint image TexturePic corresponding to the target PU from the external frame memory 16 and sets the luminance decoded pixel value recTextPic in the reference pixel refSamples[x][y] by the following formula.

refSamples[x][y]=recTexPic[xB+x][yB+y], with x=0
    to nS−1, y=0 to nS−1.

Based on the reference pixel refSamples[x][y], a total sum sumRefVals of a pixel value of the corresponding block is derived by the following formula.

sumRefVals=ΣrefSamples[x][y], with x=0 to nS−1,
    y=0 to nS−1.

Next, based on the total sum sumRefVals and the target PU size nS, a threshold threshVals is derived by the following formula. That is, an average pixel value of the corresponding block is derived.

threshVal=(sumRefVals>>(2*log 2(nS))

Here, instead of the foregoing formula, a value obtained by dividing the total sum sumRefVals by a square nS*nS of the target PU size nS may be set as the threshold threshVal.

Subsequently, the DMM 4 partition pattern generation section 145T1 derives the partition pattern wedgePattern[x][y] of the target PU by the following formula with reference to the derived threshold threshVal and the reference pixel refSamples[x][y].

wedgePattern[x][y]=(refSamples[x][y]>threshVal)

That is, in a case where the reference pixel refSamples[x][y] is greater than the threshold threshVal, 1 is set in a component (x, y) of the partition pattern. In a case where the reference pixel refSamples[x][y] is equal to or less than the threshold threshVal, 0 is set in the component (x, y) of the partition pattern.

[DMM 1 Partition Pattern Generation Section 145T2]

The DMM 1 partition pattern generation section 145T2 includes a DMM 1 partition pattern derivation section 145T6, a buffer 145T5, and a partition pattern list generation section 145T4. Generally, the DMM 1 partition pattern generation section 145T2 activates the partition pattern list generation section 145T4 only at the first activation time to generate a partition pattern list WedgePatternTable for each block size. Next, the generated partition pattern list is stored in the buffer 145T5. Subsequently, the DMM partition pattern derivation section 145T6 derives a partition pattern wedgePattern[x][y] from the partition pattern list WedgePatternTable stored in the buffer 145T5 based on the input target PU size nS, the partition pattern index wedge_full_tab_idx, and a preset standard partition pattern size nBS and outputs the partition pattern wedgePattern[x][y] to the DC prediction value derivation section 145T3.

[Partition Pattern List Generation Section 145T6]

An overview of a method of generating a partition pattern will be described with reference to FIG. 16 before description of a method of generating partition pattern list in the partition pattern list generation section 145T6. First, a partition pattern in which all of the components are 0 is generated. Subsequently, a starting point S (xs, ys) and an ending point E (xe, ye) is set in the partition pattern. In the example of FIG. 16(*a*), the starting point S (xs, ys)=(3, blocksize−1) and the ending point E (xe, ye)=(blocksize−1, 2). Subsequently, a line segment is drawn between the starting point S and the ending point E using the Bresenham algorithm (components indicated by diagonal lines in FIG. 16(*b*)). Subsequently, in the example of FIG. 16(*c*), as illustrated in FIG. 16(*d*), the partition pattern wedgePattern [x][y] is generated by setting 1 in components corresponding to the coordinates on the line segment and on the right side of the line segment. Here, blocksize is the size (a vertical width and a horizontal width) of a block in which the partition pattern is generated.

Figure 17:
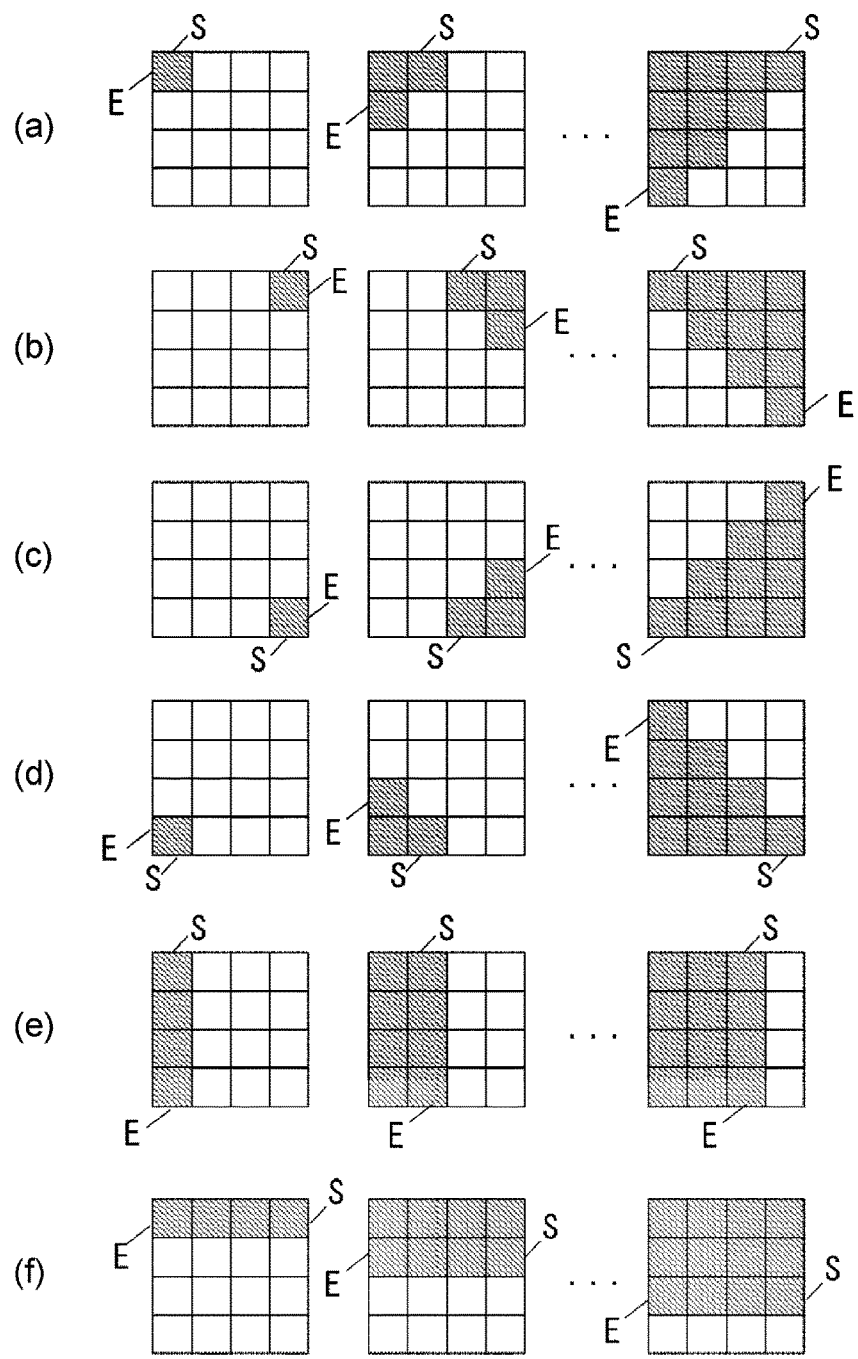
FIG. 17 is a diagram illustrating examples of other partition patterns in a wedge direction wedgeOri (wedgeOri=0 to 5) generated in a partition pattern list generation section in DMM 1 prediction.

Hereinafter, the method of generating the partition pattern list in the partition pattern list generation section 145T6 will be described. The partition pattern list generation section 145T6 mainly generates partition patterns of 6 wedge directions wedgeOri (where wedgeOri=0 to 5) according to block sizes, as illustrated in FIG. 17. In the embodiment, a minimum block size in which the partition pattern is generated is assumed to be nMinS×nMinS and a maximum block size is assumed to be nMaxS×nMaxS. The partition pattern list generation section 145T6 generates a partition pattern list of (1<<log 2BlkSize)×(1<<log 2BlkSize) for each block size in a range up to log 2BlkSize=log 2(nMinS) to log 2(nMaxS) using log 2BlkSize as a variable and outputs the partition pattern list to the buffer 145T5. For example, when nMinS=4 and nMaxS=16 are assumed, partition pattern lists of 4×4, 8×8, and 16×16 are generated. In addition, when nMinS=4 and nMaxS=8 are assumed, partition pattern lists of 4×4 and 8×8 are generated. Hereinafter, wBlksize=(1<<logBlkSize) is also used as the block size of the partition pattern.

In FIG. 17(*a*), a starting point S (xs, ys)=(0, 0) and an ending point E (xe, ye)=(0, 0) are set as initial values and the partition patterns of the wedge direction wedgeOri=0 are generated according to the same method as FIGS. 16(*a*) to 16(*d*) while repeating addition of 1 to the Y coordinates of the starting point S and addition of 1 to the X coordinates of the ending point E. This generation continues until the starting point S or the ending point E exceeds the range of the partition pattern. Subsequently, when there is no partition pattern overlapping the partition pattern lists, a partition pattern list WedgePatternTable[log 2(wBlkSize)][NumWedgePattern[log 2(wBlkS ize)]] of wBlksize×wBlksize is added. More specifically, in the generated partition pattern wedgePattern[x][y], values are set in components corresponding to the partition pattern list WedgePatternTable by the following formula.

WedgepatternTable[log 2(*w*Blksize)][NumWedgePattern[log 2(*w*BlkSize)]][*x*][*y*]=wedgePattern[*x*][*y*], with *x*=0 to *w*BlkSize−1,*y*=0 to *w*BlkSize−1.

The overlapping partition pattern is the same partition pattern as the generated partition pattern or the same partition pattern as a partition pattern in which each component value of the generated partition pattern is inversed (for example, in FIG. 15(*b*)), a partition pattern in which 0 is substituted with 1 and 1 is substituted with 0). Here, wBlksize indicates the size of the width and height of a block in which the partition pattern is generated and array NumWedgePattern[ ] indicates the number of partition patterns (the number of partition patterns) in which a logarithmic value (log 2(wBlkSize)) of the block size is an argument and which is added to the partition pattern list according to the block size. Whenever a partition pattern is added to the partition pattern list, 1 is added to the number of partition patterns NumWedgePattern[log 2(wBlkSize)]. An initial value of NumWedgePattern is 0.

In FIG. 17(*b*), a starting point S (xs, ys)=(wBlksize, 0) and an ending point E (xe, ye)=(wBlksize−1, 0) are set as initial values and the partition patterns of the wedge direction wedgeOri=1 are generated according to the same method as FIGS. 16(*a*) to 16(*d*) while repeating subtraction of 1 from the X coordinates of the starting point S and addition of 1 to the Y coordinates of the ending point E. Subsequently, when there is no partition pattern overlapping the partition pattern lists, a partition pattern list WedgePatternTable[log 2(*w*BlkSize)][NumWedgePattern[log 2(*w*BlkSize)]] of *w*Blksize×*w*Blksize is added.

In FIG. 17(*c*), a starting point S (xs, ys)=(wBlksize−1, wBlksize−1) and an ending point E (xe, ye)=(wBlksize−1, wBlksize−1) are set as initial values and the partition patterns of the wedge direction wedgeOri=2 are generated according to the same method as FIGS. 16(*a*) to 16(*d*) while repeating subtraction of 1 from the X coordinates of the starting point S and subtraction of 1 from the Y coordinates of the ending point E. Subsequently, when there is no partition pattern overlapping the partition pattern lists, a partition pattern list WedgePatternTable[log 2(*w*BlkSize)][NumWedgePattern[log 2(*w*BlkSize)]] of *w*Blksize×*w*Blksize is added.

In FIG. 17(*d*), a starting point S (xs, ys)=(0, blocksize−1) and an ending point E (xe, ye)=(0, blocksize−1) are set as initial values and the partition patterns of the wedge direction wedgeOri=3 are generated according to the same method as FIGS. 16(*a*) to 16(*d*) while repeating addition of 1 to the X coordinates of the starting point S and subtraction of 1 from the Y coordinates of the ending point E. Subsequently, when there is no partition pattern overlapping the partition pattern lists, a partition pattern list WedgePatternTable[log 2(blocksize)][NumWedgePattern[log 2(*w*Blk Size)]] of *w*Blksize×*w*Blksize is added.

In FIG. 17(*e*), a starting point S (xs, ys) (0, 0) and an ending point E (xe, ye)=(0, blocksize−1) are set as initial values and the partition patterns of the wedge direction wedgeOri=4 are generated according to the same method as FIGS. 16(*a*) to 16(*d*) while repeating addition of 1 to the X coordinates of the starting point S and subtraction of 1 from the Y coordinates of the ending point E. Subsequently, when there is no partition pattern overlapping the partition pattern lists, a partition pattern list WedgePatternTable[log 2(*w*BlkSize)][NumWedgePattern[log 2(*w*BlkSize)]] of *w*Blksize×*w*Blksize is added.

In FIG. 17(*f*), a starting point S (xs, ys)=(wBlkSize−1, 0) and an ending point E (xe, ye)=(0, 0) are set as initial values and the partition patterns of the wedge direction wedgeOri=5 are generated according to the same method as FIGS. 16(*a*) to 16(*d*) while repeating addition of 1 to the Y coordinates of the starting point S and addition of 1 to the Y coordinates of the ending point E. Subsequently, when there is no partition pattern overlapping the partition pattern lists, a partition pattern list WedgePatternTable[log 2(wBlkSize)][NumWedgePattern[log 2(wBlkSize)]] of wBlksize×wBlksize is added.

As described above, the partition pattern list generation section 145T6 can generate the partition pattern list of (1<<log 2BlkSize)×(1<<log 2BlkSize) for each block size in the range up to log 2BlkSize=log 2(nMinS) to log 2(nMaxS) using log 2BlkSize as the variable.
[Buffer 145T5]

The buffer 145T5 records the partition pattern list Wedge-PatternTable according to the block size supplied from the partition pattern list generation section 145T4.
[DMM 1 Partition Pattern Derivation Section 145T6]

The DMM 1 partition pattern derivation section 145T6 derives the partition pattern wedgePattern[x][y] from the partition pattern list WedgePatternTable stored in the buffer 145T5 based on the input target PU size nS, the partition pattern index wedge_full_tab_idx, and the preset standard partition pattern size nBS and outputs the partition pattern wedgePattern[x][y] to the DC prediction value derivation section 145T3.
(Target PU Size nS is Equal to or Less than Standard Partition Pattern Size nBS)

More specifically, in a case where the target PU size nS is equal to or less than the standard partition pattern size nBS, partition pattern designated with the partition pattern index wedge_full_tab_idx is read from the partition pattern list corresponding to the target PU size and is output. That is, the partition pattern wedgePattern[x][y] is derived by the following formula.

wedgePattern[x][y]=WedgePatternTable[log 2(nS)] [wedge_full_tab_idx][x][y], with x=0 to nS−1, y=0 to nS−1.

Here, log 2(nS) is a logarithmic value of the target PU size to base 2.
(Target PU Size nS is Greater than Standard Partition Pattern Size nBS)

In a case where the target PU size nS is greater than the standard partition pattern size nBS, a partition pattern designated with the partition pattern index wedge_full_tab_idx is read from the partition pattern list corresponding to the standard partition pattern size nBS, the partition pattern is scaled to the target PU size to derive the partition pattern wedgePattern[x][y] of the target PU and the derived partition pattern is output.

More specifically, the DMM 1 partition pattern derivation section 145T6 first derives a size ratio scale of the standard partition pattern size nBS to the target PU size by the following formula (eq. 1).

scale=log 2(nS)−log 2(nBS)=log 2(nS/nBS)   (eq. 1).

Here, log 2(nS/nBS) is a logarithmic value of a value obtained by dividing the target PU size nS by the standard partition pattern size nBS to base 2. In obtaining the logarithmic value to base 2, a conversion value of a pre-defined certain value X may be stored in a lookup table instead of the operator log 2( ) and may be obtained by referring the lookup table.

Next, the DMM 1 partition pattern derivation section 145T6 scales the partition pattern designated with the standard partition pattern size nBS and the partition pattern index wedge_full_tab_idx by the following formula based on the derived size ratio scale and derives the partition pattern of the target PU.

wedgePattern[x][y]=WedgePatternTable[log 2(nBS)] [wedge_full_tab_idx][x>>scale][y>>scale], with x=0 to nS−1, y=0 to nS−1   (eq.2).

That is, second coordinates (x2, y2) on the partition pattern in regard to the standard partition pattern size, corresponds to the first coordinates (x1, y1) on the partition pattern in regard to the target PU size, and are obtained by right shifting the first coordinates in accordance with the size ratio scale.

(x2,y2)=(x1>>scale,y1>>scale).

Accordingly, a value set at the first coordinates (x1, y1) on the partition pattern in regard to the target PU size are a value of the second coordinates (x2, y2) on the partition pattern with a corresponding standard wedge partition pattern size.

For example, when the standard partition pattern size illustrated in FIG. 18(a) is 8×8 and a certain partition pattern is scaled to 16×16 by the foregoing formula, a partition pattern of 16×16 illustrated in FIG. 18(b) is generated.

As described above, in the case where the target PU size nS is greater than the standard partition pattern size nBS, the DMM 1 partition pattern derivation section 145T6 reads the partition pattern designated with the partition pattern index wedge_full_tab_idx from the partition pattern list corresponding to the standard partition pattern size nBS, scales the partition pattern to the target PU size, and derives the partition pattern wedgePattern[x][y] of the target PU. Therefore, the partition pattern list generation section 145T4 can omit the process of generating the partition pattern list related to the block size greater than the standard partition pattern size nBS and reduce the memory size related to the partition pattern to be retained in the buffer 145T5.

In particular, the standard partition pattern size nBS in the DMM 1 partition pattern derivation section 145T6 is preferably set as a common value to the maximum block size nMaxS with which the partition pattern list is generated in the partition pattern list derivation section 145T4.

Hereinafter, memory sizes necessary to retain the partition patterns between the embodiment and a technique of the related art will be compared with reference to FIG. 19. FIGS. 19(a) to 19(c) illustrate the number of modes of the partition patterns according to the block sizes, the number of bits necessary to retain one partition pattern, a sum number of bits (the size of the partition pattern list) necessary to retain all the partition patterns according to the block sizes, a cumulative number of bits of the partition pattern list from 4×4 to N×N (where N=8, 16, and 32), and a size ratio of the partition pattern according to the block size to the size of all the partition pattern lists in a case where the standard partition pattern size nBS=16 is set and a case where the standard partition pattern size nBS=8 is similarly set in the embodiment and NPL 1.

Referring to FIG. 19(a), in the technique of the related art, a memory size of a total of 1,935,072 bits (about 242 KB) is necessary to retain the partition patterns from 4×4 to 32×32. In particular, for a 32×32 block size, a memory size necessary for partition patterns corresponding to 1503 modes occupies 80% of the whole size.

In the embodiment, on the other hand, in a case where the standard partition pattern size nS=16 is set, the partition patterns of 32×32 are generated by scaling partition patterns of 16×16 with reference to FIG. 19(b). Accordingly, for a 32×32 block size, a memory size necessary for partition patterns corresponding to 1503 modes can be reduced. That is, in a case where the standard partition pattern size nS=16 is set, a memory size necessary to retain the partition patterns can be reduced up to 396,000 bits (about 49.5 KB) compared to the technique of the related art, and thus is about 20.5% of the memory size of the technique of the related art. From an experiment of the inventor or the like, the same coding efficiency as that of the technique of the related art can be achieved in this setting. Further, since the number of modes of the partition patterns of 32×32 is the same as the number of modes (1350) of the partition patterns of 16×16 compared to the technique of the related art, a processing amount necessary to decide the modes of the partition patterns in the 32×32 block size can be reduced by about 10%.

Similarly, in the embodiment, on the other hand, in a case where the standard partition pattern size nS=8 is set, the partition patterns of 16×16 and the partition patterns of 32×32 are generated by scaling partition pattern 8×8 with reference to FIG. 19(c). Accordingly, for a 16×16 block size, a memory size necessary for partition patterns corresponding to 1350 modes can be reduced. For a 32×32 block size, a memory size necessary for partition patterns corresponding to 1503 modes can be reduced. That is, in a case where the standard partition pattern size nS=8 is set, a memory size necessary to retain the partition patterns can be reduced up to 50,400 bits (about 6.3 KB) compared to the technique of the related art, and thus is about 2.5% of the memory size of the technique of the related art. From an experiment of the inventor or the like, the same coding efficiency as that of the technique of the related art can be achieved in this setting. Further, since the number of modes of the partition patterns of the 16×16 block size and the 32×32 block size is the same as the number of modes (766) of the partition patterns of 8×8 compared to the technique of the related art, a processing amount necessary to decide the modes of the partition patterns in the 16×16 block size can be reduced by about 44% and a processing amount necessary to decide the modes of the partition patterns in the 32×32 block size can be reduced by about 50%.

(Supplements)

The DMM 1 partition pattern generation section 145T2 according to the embodiment activates the partition pattern list generation section 145T4 at the time of first activation, generates the partition pattern list according to the block size, and records the partition pattern list on the buffer 145T5, but the invention is not limited thereto. For example, the partition pattern list generation section 145T4 may be removed from the constituent elements of the DMM 1 partition pattern generation section 145T2 and the partition pattern list according to the block size may be recorded in advance on the buffer 145T5. In this way, it is possible to omit the process of generating the partition pattern list according to the block size.

[DC Prediction Value Derivation Section 145T3]

The DC prediction value derivation section 145T3 schematically partitions the target PU into two regions (for example, the regions P1 and P2 illustrated in FIG. 15(c)) based on the partition pattern wedgePattern[x][y] indicating the partition pattern of the target PU, derives a prediction value related to the region P1 and a prediction value related to the region P2 based on the input PT information and the reference pixel p[x][y], and sets and derives the prediction values derived in the regions in the predicted image predSamples[x][y].

The DC prediction value derivation section 145T3 first derives the vertical edge flag vertEdgeFlag and the horizontal edge flag horEdgeFlag by the following formulae with reference to a top leftmost component wedgePattern[0][0], a top rightmost component wedgePattern[nS−1][0], and a bottom leftmost component wedgePattern[0][nS−1] of the partition pattern in order to determine the partition direction of the partition pattern wedgePattern[x][y].

$$\text{vertEdgeFlag}=(\text{wedgePattern}[0][0]\,!=\text{wedgePattern}[nS-1][0]);\text{ and}$$

$$\text{horEdgeFlag}=(\text{wedgePattern}[0][0]\,!=\text{wedgePattern}[0][nS-1]).$$

That is, in a case where the top leftmost component wedgePattern[0][0] has the same value as the bottom leftmost component wedgePattern[nS−1][0], 0 is set in the vertical edge flag vertEdgeFlag. In a case where the top leftmost component wedgePattern[0][0] does not have the same value as the bottom leftmost component wedgePattern[nS−1][0], 1 is set in the vertical edge flag vertEdgeFlag. In a case where the vertical edge flag vertEdgeFlag is 1, it is meant that there is a partition boundary on the upper side of the target PU. In a case where the vertical edge flag vertEdgeFlag is 0, it is meant that there is no partition boundary.

Similarly, in a case where the top leftmost component wedgePattern[0][0] has the same value as the rightmost top component wedgePattern[0][nS−1], 0 is set in the horizontal edge flag horEdgeFlag. In a case where the top leftmost component wedgePattern[0][0] does not have the same value as the bottom leftmost component wedgePattern[0][nS−1], 1 is set in the horizontal edge flag horEdgeFlag. In a case where the horizontal edge flag horEdgeFlag is 1, it is meant that there is a partition boundary on the left side of the target PU. In a case where the horizontal edge flag horEdgeFlag is 0, it is meant that there is no partition boundary.

Examples of the partition patterns in accordance with combinations of the vertical edge flag vertEdgeFlag and the horizontal edge flag horEdgeFlag will be described with reference to FIG. 20. FIG. 20(a) illustrates a partition pattern indicated by (vertEdgeFlag, horEdgeFlag)=(0, 0) and there are partition boundaries on the right side and the bottom side of a block.

FIG. 20(b) illustrates a partition pattern indicated by (vertEdgeFlag, horEdgeFlag)=(1, 0) and there are partition boundaries on the top side and the bottom side of a block.

FIG. 20(c) illustrates a partition pattern indicated by (vertEdgeFlag, horEdgeFlag)=(0, 1) and there are partition boundaries on the left side and the right side of a block.

FIG. 20(d) illustrates a partition pattern indicated by (vertEdgeFlag, horEdgeFlag)=(1, 1) and there are partition boundaries on the top side and the left side of a block.

Subsequently, the DC prediction value derivation section 145T3 derives a prediction value (DC prediction value) of a depth allocated to two partitioned regions. For convenience, a region formed by components having the same value as the top leftmost component wedgePattern[0][0] of the partition pattern is assumed to be a region P1, a region formed by components having different values from the top leftmost component wedgePattern[0][0] is assumed to be a region P2, a DC prediction value related to the region P1 is assumed to be dcValLT, and a DC prediction value related to the region P2 is assumed to be dcValBR.

The DC prediction value derivation section 145T3 derives the DC prediction values dcValLT and dcValBR according to the derived vertical edge flag verEdgeFlag and the derived horizontal edge flag horEdgeFlag.

(1) In a case where the vertical edge flag vertEdgeFlag is the same as the horizontal edge flag horEdgeFlag (vertEdgeFlag==horEdgeFlag; the partition patterns of FIGS. 20(a) and 20(d)), the DC prediction values are derived in the following procedure.

The DC prediction value derivation section 145T3 sets an average value of a reference pixel p[−1][0] and a reference pixel p[0][−1] adjacent to the left and top of the topmost left pixel of the target PU in dcValLt by the following formula.

$$dcValLT=(p[-1][0]+p[0][-1])>>1.$$

Subsequently, the DC prediction value dcValBR is derived according to the horizontal edge flag horEdgeFlag. In a case where the horizontal edge flag horEdgeFlag is 1 (horEdgeFlag==1; FIG. 20(d)), an average value of a reference pixel p[−1][nS−1] adjacent to the left of the bottom leftmost pixel of the target PU and a reference pixel p[nS−1][−1] adjacent to the left of the top rightmost pixel of the target PU is set in the DC prediction value dcValBR.

$$dcValBR=(p[-1][nS-1]+p[nS-1][-1])>>1.$$

In a case where the horizontal edge flag horEdgeFlag is 0 (horEdgeFlag==0; FIG. 20(a)), an edge intensity (pixel difference) horAbsDiff in the horizontal direction of a reference pixel is compared to an edge intensity (pixel difference) verAbsDiff in the vertical direction to derive a DC prediction value based on the reference pixel in a direction in which the intensity (pixel difference) is large. That is, in a case where the edge intensity horAbsDiff in the horizontal direction is greater than the edge intensity verAbsDiff in the vertical direction, a reference pixel p[2*nS−1][−1] is set in the DC prediction value dcValBR. In other cases (horAbsDiff<=verAbsDiff), a reference pixel p[−1][2 nS−1] is set in the DC prediction value dcValBR.

$$verAbsDiff=Abs(p[-1][0]-p[-1][2*nS-1]);$$

$$horAbsDiff=Abs(p[0][-1]-p[2*nS-1][-1]); \text{ and}$$

$$dcValBR=(horAbsDiff>verAbsDiff)?p[2*nS-1][-1]:p[-1][2*nS-1].$$

(2) In a case where the vertical edge flag vertEdgeFlag is different from the horizontal edge flag horEdgeFlag (vertEdgeFlag !=horEdgeFlag; the partition patterns of FIGS. 20(b) and 20(c)), the DC prediction values are derived in the following procedure.

$$dcValLT=horEdgeFlag?p[(nS-1)>>1][-1]:p[-1][(nS-1)>>1]; \text{ and}$$

$$dcValBR=horEdgeFlag?p[-1][nS-1]:p[nS-1][-1].$$

That is, in a case where the horizontal edge flag horEdgeFlag is 1 (the vertical edge flag vertEdgeFlag is 0), a reference pixel p[(nS−1)>>1][−1] adjacent to a middle pixel of the top side of the target PU is assumed to be a DC prediction value dcValLT of the region P1 and a reference pixel p[−1][nS−1] adjacent to the left of the bottom leftmost pixel of the target PU is assumed to be a DC prediction value dcValBR of the region P2. Conversely, in a case where the horizontal edge flag horEdgeFlag is 0 (the vertical edge flag vertEdgeFlag is 1), a reference pixel p[−1][(nS−1)>>1] adjacent to the left of a middle pixel of the left side of the target PU is assumed to be the DC prediction value dcValLT of the region P1 and a reference pixel p[−1][nS−1] adjacent to the top rightmost pixel of the target PU is assumed to be the DC prediction value dcValBR of the region P2.

Subsequently, the DC prediction value derivation section 145T3 derives the predicted image predSamples[x][y] of the target PU based on the derived DC prediction values dcValBR and dcValLT of the regions and the DC offset values DcOffset[ ] and the DC offset presence or absence flags depth_dc_flag of the regions of the target PU supplied from the variable-length decoding section 11.

First, referring to the partition pattern wedgePattern[x][y], the DC prediction value predDcVal of the target pixel is set in dcValLT in a case where a pixel position (x, y) in the target PU belongs to the region P1 (wedgePattern[x][y]==wedgePattern[0][0]). The DC prediction value predDcVal of the target pixel is set in dcValBR in a case where the target pixel belongs to the region P2 (wedgePattern[x][y] !=wedgePattern[0][0]).

$$predDcVal=(wedgePattern[x][y]==wedgePattern[0][0])?dcValLT:dcValBR.$$

Next, the DC offset value dcOffset of the target pixel is set with reference to the DC offset presence or absence flag depth_dc_flag and the DC offset value dcOffset[ ].

$$dcOffset=depth\_dc\_flag?DcOffset[wedgePattern[x][y]]:0.$$

That is, in a case where the DC offset presence or absence flag is 1, a DC offset value dcOffset[wedgePattern[x][y]] corresponding to a value of the partition pattern wedgePattern[x][y] is set in the DC offset value dcOffset of the target pixel. In a case where the DC offset presence or absence flag is 0, 0 is set in the DC offset value dcOffset of the target pixel. Here, in a case where the DC offset presence or absence flag is 1, it is indicated that there is a DC offset value. In a case where the DC offset presence or absence flag is 0, it is indicated that the DC offset value is 0.

A sum of the derived DC prediction value predDcVal of the target pixel and the derived DC offset value dcOffset of the target pixel is set as a prediction value of the target pixel.

$$predSamples[x][y]=predDcVal+dcOffset.$$

In this way, the DC prediction value derivation section 145T3 can derive the predicted image predSamples[x][y] of the target PU.

(Operations and Advantageous Effects)

In a case where the DMM 1 prediction is selected in the target PU and a case where the block size of the target PU is equal to or less than the standard partition pattern size, the predicted image generation section included in the moving image decoding device 1 according to the above-described embodiment reads the partition pattern designated by the block size of the target PU and the partition pattern index wedge_full_tab_idx from the partition pattern list and derives the partition pattern to be applied to the target PU. Conversely, in a case where the block size of the target PU is greater than the standard partition pattern size, the partition pattern to be applied to the target PU is derived by reading the partition pattern designated by the partition pattern index wedge_full_tab_idx and the standard partition pattern size from the partition pattern list and scaling the partition pattern to the block size of the target PU.

Accordingly, in the DMM 1 prediction, it is possible to omit the process of generating the partition pattern list with the block size greater than the standard partition pattern size and reducing the memory size necessary to retain the partition pattern list.

It is possible to obtain the advantageous effect of considerably reducing the memory size for retaining the partition patterns while maintaining coding efficiency by deleting the lookup table for retaining the partition pattern with the first size, scaling the partition pattern with the second size smaller than the first size to the first size, and generating the partition pattern with the first size in the DMM 1 prediction.

[Moving Image Coding Device]

Figure 21:
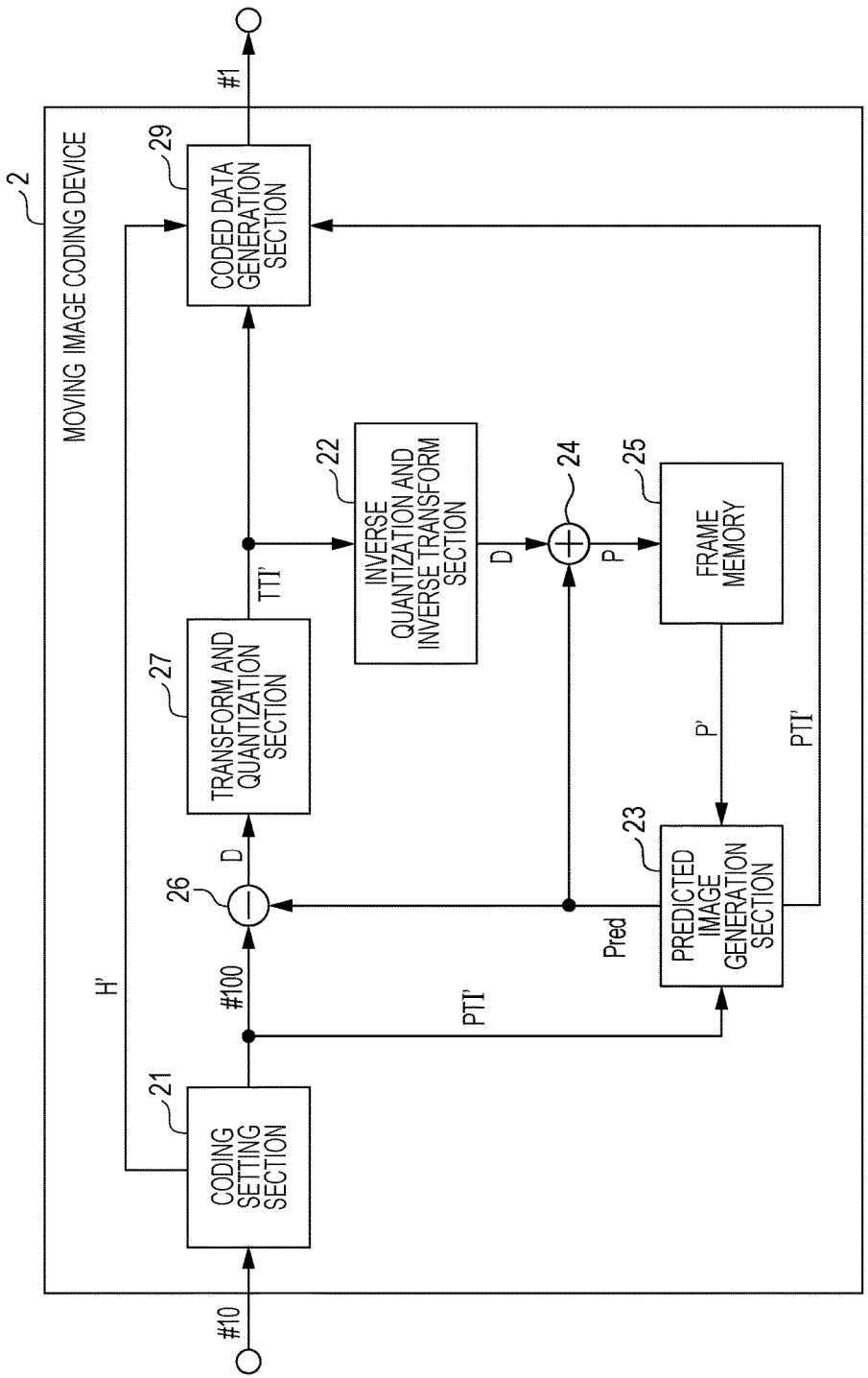
FIG. 21 is a functional block diagram illustrating the configuration of the moving image coding device according to an embodiment of the invention.

Hereinafter, the configuration of the moving image coding device 2 according to the embodiment will be described with reference to FIG. 21.

(Overview of Moving Image Coding Device)

Roughly speaking, the moving image coding device 2 is a device that generates the coded data #1 by coding an input image #10 and outputs the coded data #1. Here, the input image #10 is a layer image that is formed by one or a plurality of viewpoint images TexturePic and a depth map DepthPic of the same time corresponding to the viewpoint image TexturePic.

(Configuration of Moving Image Coding Device)

First, an example of the configuration of the moving image coding device 2 will be described with reference to FIG. 21. FIG. 21 is a functional block diagram illustrating the configuration of the moving image coding device 2. As illustrated in FIG. 21, the moving image coding device 2 includes a coding setting section 21, an inverse quantization and inverse transform section 22, a predicted image generation section 23, an addition section 24, a frame memory 25, a subtraction section 26, a transform and quantization section 27, and a coded data generation section 29.

The coding setting section 21 generates image data and various kinds of setting information related to the coding based on the input image #10.

Specifically, the coding setting section 21 generates subsequent image data and setting information.

First, the coding setting section 21 generates a CU image #100 in regard to the target CU by sequentially separating the input image #10 in the slice unit, the tree block unit, and the CU unit.

The coding setting section 21 generates header information H' based on a result of the partition process. The header information H' includes (1) information regarding the size and shape of a tree block belong to a target slice and the position of the tree block in the target slice and (2) CU information CU' regarding the size and shape of the CU belonging to each tree block and the position of the CU in the target tree block.

The coding setting section 21 further generates PT setting information PTI' with reference to the CU image #100 and the CU information CU'. The PT setting information PTI' includes (1) a partition pattern allocatable to each PU of the target CU and (2) information regarding all combinations of the prediction modes allocated to each PU.

The coding setting section 21 supplies the CU image #100 to the subtraction section 26. The coding setting section 21 supplies the header information H' to the coded data generation section 29. The coding setting section 21 supplies the PT setting information PTI' to the predicted image generation section 23.

The inverse quantization and inverse transform section 22 restores the prediction residual for each block by executing inverse quantization and inverse orthogonal transform the quantized prediction residual of each block supplied from the transform and quantization section 27. Since the inverse orthogonal transform has been described above in the inverse quantization and inverse transform section 13 illustrated in FIG. 3, the description thereof will be omitted here.

The inverse quantization and inverse transform section 22 integrates the prediction residuals of the blocks according to the partition pattern designated by the TT partition information (to be described later) to generate a prediction residual D in regard to the target CU. The inverse quantization and inverse transform section 22 supplies the generated prediction residual D in regard to the target CU to the addition section 24.

The predicted image generation section 23 generates a predicted image Pred in regard to the target CU with reference to the decoded image P' and the PT setting information PTI' recorded on the frame memory 25. The predicted image generation section 23 sets the prediction parameters obtained through the predicted image generation process in the PT setting information PTI' and transmits the set PT setting information PTI' to the coded data generation section 29. Since the predicted image generation process executed by the predicted image generation section 23 is the same as that of the predicted image generation section 14 included in the moving image decoding device 1, the description thereof will be omitted here.

The addition section 24 generates a decoded image P in regard to the target CU by adding the predicted image Pred supplied from the predicted image generation section 23 and the prediction residual D supplied from the inverse quantization and inverse transform section 22.

The decoded images P are sequentially recorded on the frame memory 25. The decoded images corresponding to all of the tree blocks (for example, all of the tree blocks previous in a raster scan procedure) decoded earlier than the target tree block are recorded at a time point at which the target tree block is decoded on the frame memory 25.

The subtraction section 26 generates the prediction residual D in regard to the target CU by subtracting the predicted image Pred from the CU image #100. The subtraction section 26 supplies the generated prediction residual D to the transform and quantization section 27.

The transform and quantization section 27 generates a quantized prediction residual D by executing orthogonal transform and quantization. Here, the orthogonal transform refers to transform to a frequency domain from a pixel region. Examples of inverse orthogonal transform include a discrete cosine transform (DCT transform) and discrete sine transform (DST transform).

Specifically, the transform and quantization section 27 decides the partition pattern to one or a plurality of blocks of the target CU with reference to the CU image #100 and the CU information CU'. The prediction residual D is partitioned into prediction residuals of the blocks according to the decided partition pattern.

The transform and quantization section 27 generates a quantized prediction residual of each block by generating the prediction residual in a frequency domain through orthogonal transform on the prediction residual in regard to each block and subsequently quantizing the prediction residual in the frequency domain.

The transform and quantization section 27 generates TT setting information TTI' including the generated quantized prediction residual of each block, the TT partition information for designating the partition pattern of the target CU, and information regarding all of the possible partition patterns to the blocks of the target CU. The transform and quantization section 27 supplies the generated TT setting information TTI' to the inverse quantization and inverse transform section 22 and the coded data generation section 29.

The coded data generation section 29 codes the header information H', the TT setting information TTI', and the PT setting information PTI', multiplex the coded header information H, the TT setting information PTI, and the PT setting information PTI to generate the coded data #1, and outputs the coded data #1.

(Operations and Advantageous Effects)

In a case where the DMM 1 prediction is selected in the target PU and a case where the block size of the target PU is equal to or less than the standard partition pattern size, the predicted image generation section included in the moving image coding device 2 according to the above-described embodiment reads the block size of the target PU and the partition pattern designated by the partition pattern index wedge_full_tab_idx from the partition pattern list and derives the partition pattern to be applied to the target PU. Conversely, in a case where the block size of the target PU is greater than the standard partition pattern size, the partition pattern to be applied to the target PU is derived by reading the partition pattern designated by the partition pattern index wedge_full_tab_idx and the standard partition pattern size from the partition pattern list and scaling the partition pattern to the block size of the target PU.

Accordingly, in the DMM 1 prediction, it is possible to omit the process of generating the partition pattern list with the block size greater than the standard partition pattern size and reducing the memory size necessary to retain the partition pattern list.

That is, the DMM 1 prediction, it is possible to obtain the advantageous effect of considerably reducing the memory size for retaining the partition patterns while maintaining coding efficiency by deleting the lookup table for retaining the partition pattern with the first size, scaling the partition pattern with the second size smaller than the first size to the first size, and generating the partition pattern with the first size.

Application Example

The moving image coding device 2 and moving image decoding device 1 described above can be mounted on various apparatuses transmitting, receiving, recording, and reproducing a moving image for use. The moving image may be a natural moving image captured by a camera or the like or may be an artificial moving image (including a CG and a GUI) created by a computer or the like.

First, the above-described moving image coding device 2 and moving image decoding device 1 which can be used to transmit and receive a moving image will be described with reference to FIG. 22.

FIG. 22(a) is a block diagram illustrating the configuration of a transmission apparatus PROD_A on which the moving image coding device 2 is mounted. As illustrated in FIG. 22(a), a transmission apparatus PROD_A includes a coding section PROD_A1 that obtains coded data by coding a moving image, a modulation section PROD_A2 and that obtains a modulated signal by modulating carrier waves using the coded data obtained by the coding section PROD_A1, and a transmission section PROD_A3 that transmits the modulation signal obtained by the modulation section PROD_A2. The above-described moving image coding device 2 is used as the coding section PROD_A1.

The transmission apparatus PROD_A may further include a camera PROD_A4 that captures a moving image as a supply source of a moving image input to the coding section PROD_A1, a recording medium PROD_A5 that records the moving image, an input terminal PROD_A6 that inputs the moving image from the outside, and an image processing section A7 that generates or processes an image. In FIG. 22(a), the configuration of the transmission apparatus PROD_A including all of the sections is exemplified, but some of the sections may be omitted.

The recording medium PROD_A5 may be a recording medium that records an uncoded moving image or may be a recording medium that records a moving image coded according to a coding scheme for recording different from a coding scheme for transmission. In the latter case, a decoding section (not illustrated) that decodes coded data read from the recoding medium PROD_A5 according to the coding scheme for recording may be interposed between the recording medium PROD_A5 and the coding section PROD_A1.

FIG. 22(b) is a block diagram illustrating the configuration of a reception apparatus PROD_B on which the moving image decoding device 1 is mounted. As illustrated in FIG. 22(b), the reception apparatus PROD_B includes a reception section PROD_B1 that receives a modulated signal, a demodulation section PROD_B2 that obtains coded data by demodulating the modulated signal received by the reception section PROD_B1, and a decoding section PROD_B3 that obtains a moving image by decoding the coded data obtained by the demodulation section PROD_B2. The above-described moving image decoding device 1 is used as the decoding section PROD_B3.

The reception apparatus PROD_B may further include a display PROD_B4 that displays the moving image as a supply destination of the moving image output by the decoding section PROD_B3 a recording medium PROD_B5 that records the moving image, and an output terminal PROD_B6 that outputs the moving image to the outside. In FIG. 22(b), the configuration of the reception apparatus PROD_B including all of these sections is exemplified, but some of the sections may be omitted.

The recording medium PROD_B5 may be a recording medium that records an uncoded moving image or may be a recording medium that records a moving image coded according to a coding scheme for recording different from a coding scheme for transmission. In the latter case, a coding section (not illustrated) that codes the moving image acquired from the decoding section PROD_B3 according to the coding scheme for recording may be interposed between the decoding section PROD_B3 and the recording medium PROD_B5.

A transmission medium through which a modulated signal is transmitted may be a wireless medium or a wired medium. A transmission form in which a modulated signal is transmitted may be broadcasting (here, a transmission form in which a transmission designation is not specified in advance) or may be communication (here, a transmission form in which a transmission destination is specified in advance). That is, the transmission of the modulated signal may be realized by any one of wireless broadcasting, wired broadcasting, wireless communication, and wired communication.

For example, a broadcast station (broadcast equipment or the like)/reception station (a television receiver or the like) for terrestrial digital broadcasting is an example of the transmission apparatus PROD_A/reception apparatus PROD_B transmitting or receiving a modulated signal by wireless broadcasting. Further, a broadcast station (broadcast equipment or the like)/reception station (television receiver or the like) for cable television broadcasting is an example of the transmission apparatus PROD_A/reception apparatus PROD_B transmitting or receiving a modulated signal by wired broadcasting.

A server (a workstation or the like)/client (a television receiver, a personal computer, a smartphone, or the like) for a video on demand (VOD) service in which the Internet is used, a moving image sharing service, or the like is an example of the transmission apparatus PROD_A/reception apparatus PROD_B transmitting or receiving a modulated signal by communication (typically, one of wireless and wired media is used as a transmission medium in a LAN and a wired medium is used as a transmission medium in a WAN). Here, the personal computer includes a desktop PC, a laptop PC, and a tablet PC. The smartphone also includes a multi-function portable phone terminal.

The client for the moving image sharing service has not only a function of decoding coded data downloaded from the server and displays the coded data on a display but also a function of coding a moving image captured by a camera and uploading the coded moving image to the server. That is, the client for the moving image sharing service functions as both of the transmission apparatus PROD_A and the reception apparatus PROD_B.

The above-described moving image coding device 2 and moving image decoding device 1 which can be used to record and reproduce a moving image will be described with reference to FIG. 23.

FIG. 23(a) is a block diagram illustrating the configuration of a recording apparatus PROD_C on which the above-described moving image coding device 2 is mounted. As illustrated in FIG. 23(a), the recording apparatus PROD_C includes a coding section PROD_C1 that obtains coded data by coding a moving image and a writing section PROD_C2 that writes the coded data obtained by the coding section PROD_C1 on a recording medium PROD M. The above-described moving image coding device 2 is used as the coding section PROD_C1.

The recording medium PROD M may be (1) a type of medium included in the recording apparatus PROD_C, such as a hard disk drive (HDD) or a solid state drive (SSD), may be (2) a type of medium connected to the recording apparatus PROD_C, such as an SD memory card or a Universal Serial Bus (USB) flash memory, or may be (3) a medium loaded on a drive device (not illustrated) included in the recording apparatus PROD_C, such as a Digital Versatile Disc (DVD) or a Blu-ray (registered trademark) disc (BD).

The recording apparatus PROD_C may further include a camera PROD_C3 that captures a moving image as a supply source of a moving image to be input to the coding section PROD_C1, an input terminal PROD_C4 that inputs a moving image from the outside, a reception section PROD_C5 that receives a moving image, and an image processing section C6 that generates or processes an image. In FIG. 23(a), the configuration of the recording apparatus PROD_C including all of the sections is exemplified, but some of the sections may be omitted.

The reception section PROD_C5 may be a reception section that receives an uncoded moving image or may be a reception section that receives coded data coded according to a coding scheme for transmission different from a coding scheme for recording. In the latter case, a decoding section (not illustrated) for transmission that decodes the coded data coded according to the coding scheme for transmission may be interposed between the reception section PROD_C5 and the coding section PROD_C1.

Examples of the recording apparatus PROD_C include a DVD recorder, a BD recorder, and a Hard Disk (HD) recorder (in this case, the input terminal PROD_C4 or the reception PROD_C5 is a main supply source of a moving image). A camcorder (in this case, the camera PROD_C3 is a main supply source of a moving image), a personal computer (in this case, the reception section PROD_C5 is a main supply source of a moving image), a smartphone (in this case, the camera PROD_C3, the reception section PROD_C5, or the image processing section C6 is a main supply source of a moving image), and the like are also examples of the recording apparatus PROD_C.

FIG. 23(b) is a block diagram illustrating the configuration of a reproduction apparatus PROD_D on which the above-described moving image decoding device 1 is mounted. As illustrated in FIG. 23(b), the reproduction apparatus PROD_D includes a reading section PROD_D1 that reads coded data written on a recording medium PROD M and a decoding section PROD_D2 that obtains a moving image by decoding the coded data read by the reading section PROD_D1. The above-described moving image decoding device 1 is used as the decoding section PROD_D2.

The recording medium PROD M may be (1) a type of medium included in the reproduction apparatus PROD_D, such as an HDD or an SSD, may be (2) a type of medium connected to the reproduction apparatus PROD_D, such as an SD memory card or a USB flash memory, or may be (3) a medium loaded on a drive device (not illustrated) included in the reproduction apparatus PROD_D, such as a DVD or a BD.

The reproduction apparatus PROD_D may further include a display PROD_D3 that displays a moving image as a supply destination of the moving image output by the decoding section PROD_D2, an output terminal PROD_D4 that outputs the moving image to the outside, and a transmission section PROD_D5 that transmits the moving image. In FIG. 23(b), the configuration of the reproduction apparatus PROD_D including all of the sections is exemplified, but some of the sections may be omitted.

The transmission section PROD_D5 may be a transmission section that transmits an uncoded moving image or may be a transmission section that transmits the coded data coded according to a coding scheme for transmission different from a coding scheme for recording. In the latter case, a coding section (not illustrated) that codes a moving image according to the coding scheme for transmission may be interposed between the decoding section PROD_D2 and the transmission section PROD_D5.

Examples of the reproduction apparatus PROD_D include a DVD player, a BD player, and an HDD player (in this case, the output terminal PROD_D4 connected to a television receiver or the like is a main supply destination of a moving image). A television receiver (in this case, the display PROD_D3 is a main supply destination of a moving image), a digital signage (which is also referred to as an electronic signboard or an electronic bulletin board and the display PROD_D3 or the transmission section PROD_D5 is a main supply destination of a moving image), a desktop PC (in this case, the output terminal PROD_D4 or the transmission section PROD_D5 is a main supply destination of a moving image), a laptop or tablet PC (in this case, the display PROD_D3 or the transmission section PROD_D5 is a main supply destination of a moving image), a smartphone (in this case, the display PROD_D3 or the transmission section PROD_D5 is a main supply destination of a moving image), and the like are examples of the reproduction apparatus PROD_D.

(Hardware Realization and Software Realization)

Blocks of the moving image decoding device 1 and the moving image coding device 2 may be realized by hardware such as a logical circuit formed on an integrated circuit (IC chip) or may be realized by software using a central processing unit (CPU).

In the latter case, each of the foregoing devices includes a CPU that executes a command of a control program realizing each function, a read-only memory (ROM) that stores the program, a random access memory (RAM) on which the program is loaded, and a storage device (recording medium) such as a memory that stores the program and various kinds of data. An object of the present invention can also be achieved by providing each of the foregoing devices with a recording medium that records a program code (an execution format program, an intermediate code program, or a source program) of a control program of each of the foregoing devices which is software realizing the above-described functions in a computer-readable manner and by causing a computer (a CPU or an MPU) to read and execute the program code recorded on the recording medium.

As the recording medium, for example, a kind of tape such as a magnetic tape or a cassette tape, a kind of disc including a magnetic disk such as floppy (registered trademark) disk/hard disk and an optical disc such as compact disc read-only memory (CD-ROM)/magneto-optical disc (MO discs)/mini disc (MD)/digital versatile disc (DVD)/CD recordable (CD-R)/Blu-ray disc (registered trademark), a kind of card such as an IC card (including a memory card)/optical card, a kind of semiconductor memory such as mask ROM/erasable programmable read-only Memory (EPROM)/electrically erasable and programmable read-only memory (EEPROM) (registered trademark)/flash ROM, or a kind of logical circuit such as a programmable logic device (PLD) or a field programmable gate array (FPGA) can be used.

Each of the foregoing devices may be configured to be connected to a communication network and the program code may be supplied via the communication network. The communication network may be able to transmit the program code and is not particularly limited. For example, the Internet, an intra-net, an extra-net, a local area network (LAN), an integrated services digital network (ISDN), a value-added network (VAN), a community antenna television/cable television (CATV) communication network, a virtual private network, a telephone circuit network, a mobile communication network, or a satellite communication network can be used. A transmission medium that configures the communication network may be a medium capable of transmitting the program code and is not particularly limited to a specific configuration or a kind of medium. For example, a wired medium such as Institute of Electrical and Electronic Engineers (IEEE) 1394, a USB, power line broadcasting, a cable TV circuit line, a telephone line, or an asymmetric digital subscriber line (ADSL) circuit, an infrared medium such as infrared data association (IrDA) or a remote controller, or a wireless medium such as Bluetooth (registered trademark), IEEE 802.11 wireless, high data rate (HDR), near field communication (NFC), digital living network alliance (DLNA), a portable telephone network, a satellite circuit, or a terrestrial digital network can be used. The present invention can also be realized in a form of a computer data signal in which the program code is embodied through electronic transmission and is embedded in a carrier wave.

CONCLUSION

According to Aspect 1 of the invention, a DMM prediction section includes: a DMM 1 partition pattern generation section that derives a partition pattern to be applied to a target PU; and a DC prediction value derivation section that derives a prediction value of each region in the target PU based on the partition pattern derived by the DMM 1 partition pattern generation section, a decoded pixel adjacent to the target PU, and DC offset information of each region in the target PU specified by the partition pattern. The DMM 1 partition pattern generation section derives the partition pattern to be applied to the target PU based on a target PU size, a standard partition pattern size, a partition pattern index for designating the partition pattern to be applied to the target PU, and a partition pattern list.

According to Aspect 2 of the invention, in the DMM prediction section according to the foregoing Aspect 1, the DMM 1 partition pattern generation section may set a partition pattern designated by the partition pattern index from a partition pattern list according to the target PU size as a partition pattern applied to the target PU in a case where the target PU size is equal to or less than the standard partition pattern size. The DMM 1 partition pattern generation section may scale the partition pattern designated by the partition pattern index from the partition pattern list corresponding to the standard partition pattern size to the target PU size and derive the partition pattern to be applied to the target PU in a case where the target PU size is greater than the standard partition pattern size.

According to Aspect 3 of the invention, in the DMM prediction section according to the foregoing Aspect 2, a size ratio for scaling the partition pattern may be derived from the standard partition pattern size and the target PU size.

According to Aspect 4 of the invention, in the DMM prediction section according to the foregoing Aspect 3, the size ratio may be a difference between a logarithmic value of the target PU size to base 2 and a logarithmic value of the partition pattern to base 2.

According to Aspect 5 of the invention, in the DMM prediction section according to the foregoing Aspect 4, second coordinates on the partition pattern of the standard partition pattern size corresponding to first coordinates on the partition pattern of the target PU size may be coordinates obtained by right shifting the first coordinates in accordance with the size ratio.

According to Aspect 6 of the invention, the DMM prediction section according to the foregoing Aspects 1 to 5 of the invention may further include a partition pattern list generation section that further generates the partition pattern list according to a block size. The partition pattern list generation section may generate the partition pattern list from a minimum block size to a standard partition pattern size.

According to Aspect 7 of the invention, in the DMM prediction section according to the foregoing Aspect 6, the minimum block size may be a 4×4 block size.

According to Aspect 8 of the invention, in the DMM prediction section according to the foregoing Aspect 6, the standard partition pattern size may be an 8×8 block size.

According to Aspect 9 of the invention, in the DMM prediction section according to the foregoing Aspect 6, the standard partition pattern size may be a 16×16 block size.

According to Aspect 10 of the invention, an image decoding device includes: the DMM prediction section according to any one of claims 1 to 9; and a DMM prediction mode information decoding section that decodes prediction mode information regarding DMM prediction. The DMM prediction section performs the DMM 1 prediction in a case where the DMM prediction mode information indicates DMM 1 prediction.

According to Aspect 11 of the invention, an image coding device includes: the DMM prediction section according to any one of claims 1 to 9; and a DMM prediction mode information coding section that codes prediction mode information regarding DMM prediction. The DMM prediction section performs the DMM 1 prediction in a case where the DMM prediction mode information indicates DMM 1 prediction.

INDUSTRIAL APPLICABILITY

The invention can be applied to an image decoding device that decodes coded data obtained by coding image data and an image coding device that generates coded data by coding image data. The invention can also be appropriately applied to a data structure of coded data generated by the image coding device and referred to by the image decoding device.

REFERENCE SIGNS LIST 1 moving image decoding device (image decoding device)
11 variable-length decoding section (DMM prediction mode information decoding section)
13 inverse quantization and inverse transform section
14 predicted image generation section
141 prediction unit setting section
142 reference pixel setting section
143 switch
144 reference pixel filtering section
145 predicted image derivation section
145D DC prediction section
145P planar prediction section
145A angular prediction section
145T DMM prediction section
145T1 DMM 4 partition pattern generation section
145T2 DMM 1 partition pattern generation section
145T3 DC prediction value derivation section
145T5 partition pattern list generation section
145T5 buffer
145T6 DMM 1 partition pattern derivation section
15 addition section
16 frame memory
2 moving image coding device
21 coding setting section
22 inverse quantization and inverse transform section
23 predicted image generation section
24 addition section
25 frame memory
26 subtraction section
27 transform and quantization section
29 coded data generation section (DMM prediction mode information coding section)

The invention claimed is:

1. In an image coding or decoding system wherein an image is represented by a plurality of image blocks encoded to form image data representing the image, a partition pattern generation device for generating a partition pattern corresponding to a block size of an image block, comprising circuitry that
generates the partition pattern by a first partition pattern generating method in a case where the block size is equal to or less than a standard value;
generates the partition pattern by a second partition pattern generating method, which is different from the first partition pattern generating method, in a case where the block size is greater than the standard value;
derives a DC prediction value related to each region in a target block with reference to (i) the partition pattern and (ii) a reference pixel in a block adjacent to the target block, and
derives a predicted image of the target block on a basis of (i) the DC prediction value and (ii) a DC offset value of each region in the target block specified by the partition pattern; wherein the predicted image is used to code or decode the image data.

2. The partition pattern generation device according to claim 1,
wherein the second partition pattern generating method includes, for the generation of the partition pattern, referring to a partition pattern for a case where the block size is equal to the standard value.

3. The partition pattern generation device according to claim 2,
wherein the second partition pattern generating method includes, for the generation of the partition pattern, using coordinates obtained by right shifting the partition pattern for the case where the block size is equal to the standard value.

4. The partition pattern generation device according to claim 2,
wherein the second partition pattern generating method, for the generation of the partition pattern, using coordinates obtained by right shifting, by one bit, the partition pattern for the case where the block size is equal to the standard value.

5. The partition pattern generation device according to claim 2,
wherein the standard value indicates 16×16.

6. The partition pattern generation device according to claim 1,
wherein the block size indicates one of 4×4, 8×8, 16×16, and 32×32.

7. A prediction device, comprising:
the partition pattern generation device according to claim 1.

8. An image decoding device, comprising:
the prediction device according to claim 7.

9. An image coding device, comprising:
the prediction device according to claim 7.

* * * * *